(12) United States Patent
Moreno

(10) Patent No.: US 11,853,931 B2
(45) Date of Patent: Dec. 26, 2023

(54) METHOD FOR STAFFING A COMMERCIAL VEHICLE WITH A DRIVER

(71) Applicant: Premium Transport Staffing, Inc., Ontario, CA (US)

(72) Inventor: Eddie A. Moreno, Ontario, CA (US)

(*) Notice: Subject to any disclaimer, the term of this patent is extended or adjusted under 35 U.S.C. 154(b) by 62 days.

(21) Appl. No.: 16/718,002

(22) Filed: Dec. 17, 2019

(65) Prior Publication Data

US 2020/0193356 A1 Jun. 18, 2020

Related U.S. Application Data

(60) Provisional application No. 62/780,797, filed on Dec. 17, 2018.

(51) Int. Cl.
  *G06Q 10/0631* (2023.01)
  *G06Q 10/1053* (2023.01)

(52) U.S. Cl.
  CPC . *G06Q 10/063112* (2013.01); *G06Q 10/1053* (2013.01)

(58) Field of Classification Search
  CPC .............. G06Q 10/063112; G06Q 10/1053
  See application file for complete search history.

(56) References Cited

U.S. PATENT DOCUMENTS

| | | | | |
|---|---|---|---|---|
| 2004/0162844 | A1* | 8/2004 | Thome | G06Q 10/08 |
| 2012/0029962 | A1* | 2/2012 | Podgurny | G06Q 50/30 |
| | | | | 705/7.13 |
| 2012/0265770 | A1* | 10/2012 | Desjardins | G06Q 10/06 |
| | | | | 707/748 |
| 2016/0092817 | A1* | 3/2016 | Graham | G06F 3/0482 |
| | | | | 705/7.26 |
| 2017/0127215 | A1* | 5/2017 | Khan | H04W 4/50 |
| 2019/0107398 | A1* | 4/2019 | Erlenbach | G01C 21/32 |

FOREIGN PATENT DOCUMENTS

CA 2744473 A1 * 12/2011 ............. G06Q 10/06

OTHER PUBLICATIONS

Jackson, IT Strategies for Increased Rail Employee Satisfaction, Oct. 2008, https://ieeexplore.ieee.org/stamp/stamp.jsp?tp=&arnumber=4629720, p. 1-3.*
Interview Questions PDF, Top 20 Driver Interview Question and Answers, Sep. 4, 2015, https://web.archive.org/web/20150904013008/https://www.interviewquestionspdf.com/2015/06/top-20-driver-interview-question-and.html, p. 1-5.*

* cited by examiner

*Primary Examiner* — Mehmet Yesildag
*Assistant Examiner* — James Webb

(57) ABSTRACT

A method for staffing a commercial vehicle with a driver includes sending to a server, by a dispatch computing device associated with a job dispatcher, a job order to staff a commercial vehicle with a driver. The method includes receiving, from a driver computing device associated with the driver, an identification of the driver and one or more driver qualifications. The method includes verifying, by the server, the one or more driver qualifications in response to receiving the identification of the driver and the one or more driver qualifications. The method includes receiving, from the driver computing device, a request to be assigned to the job order. The method includes assigning, by the dispatch computing device, the job order to the driver by accepting the request received from the driver computing device.

18 Claims, 24 Drawing Sheets

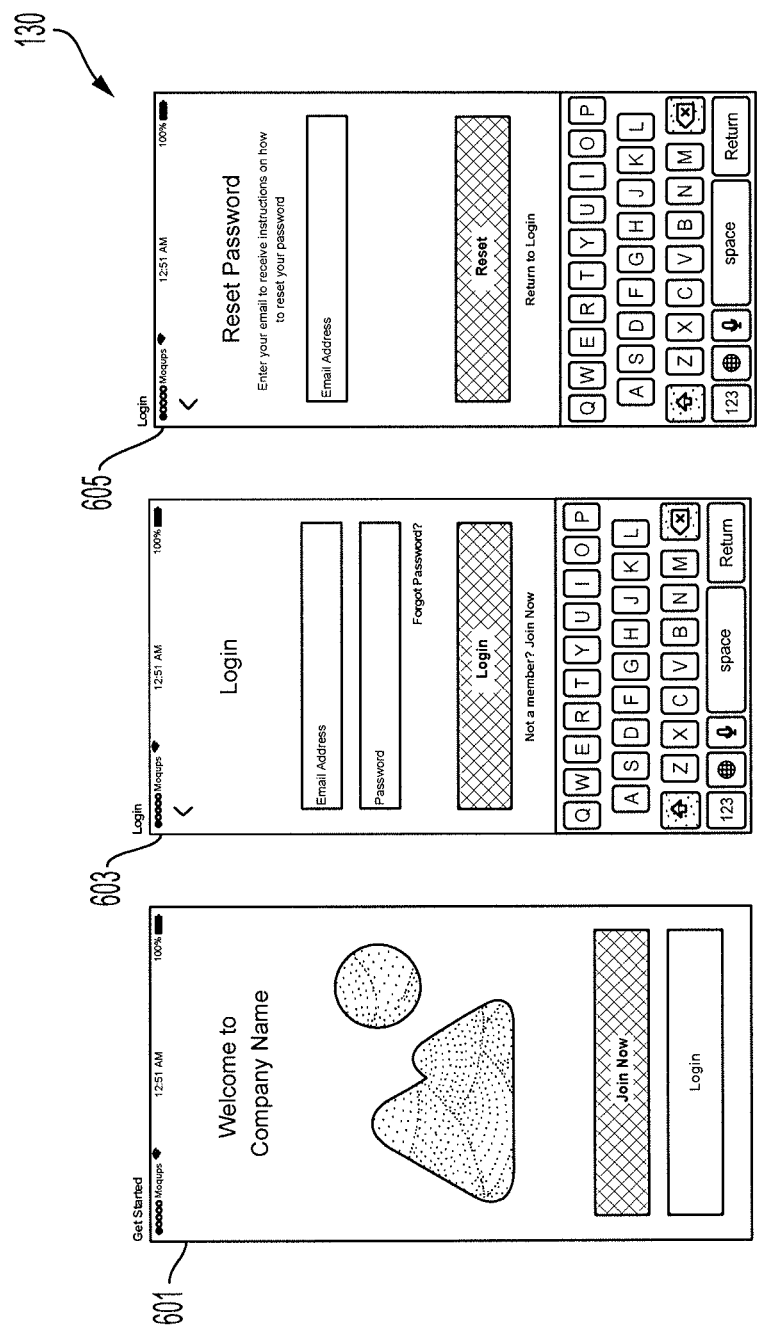

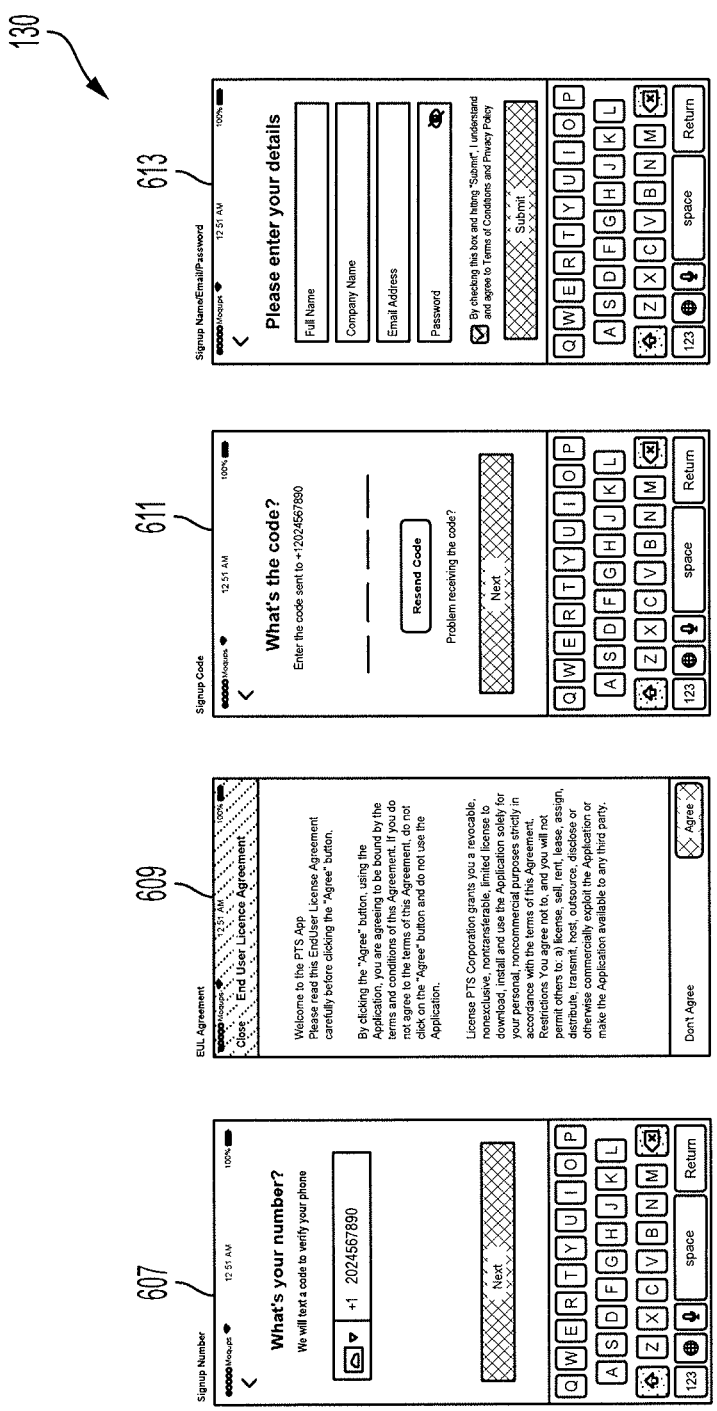

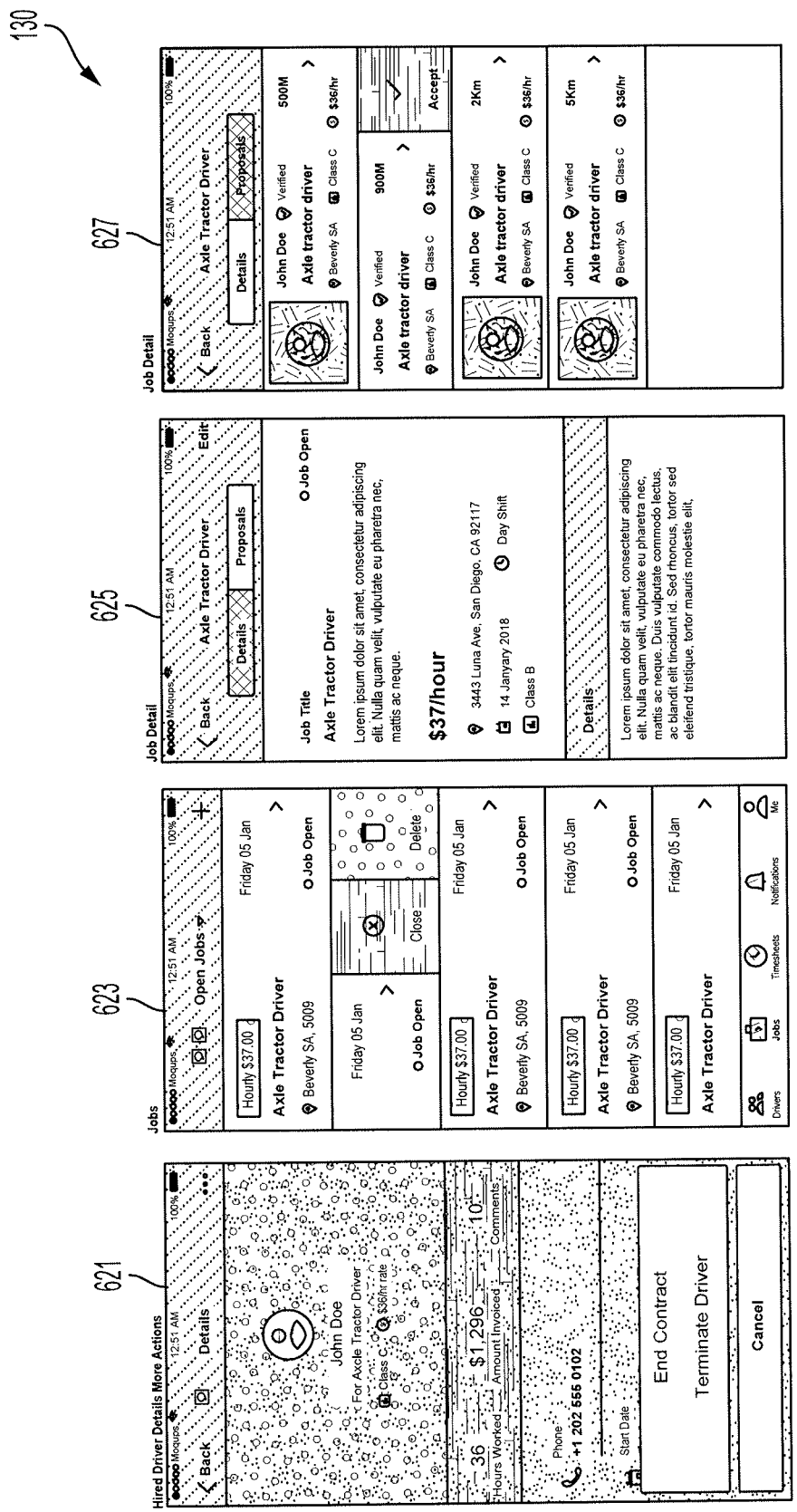

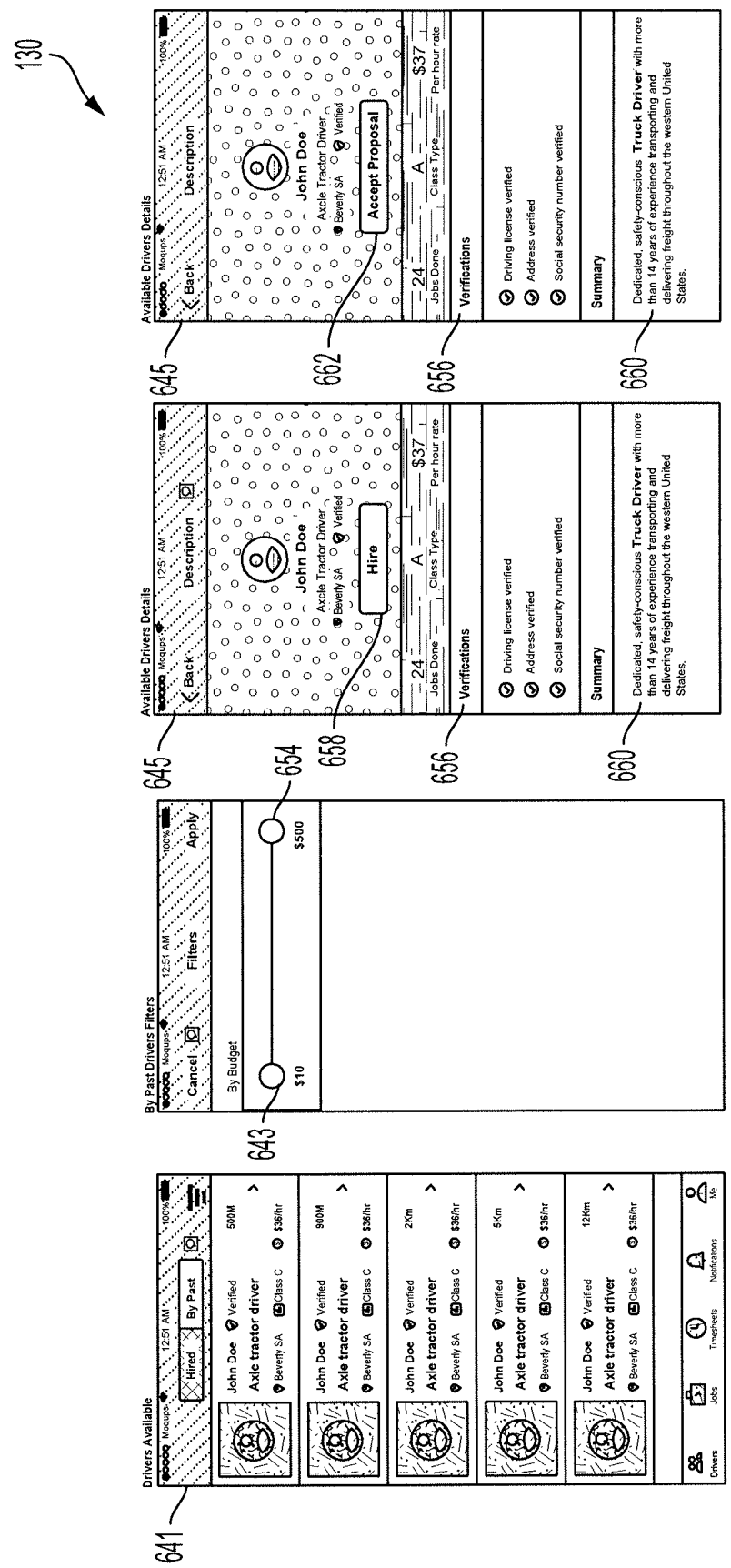

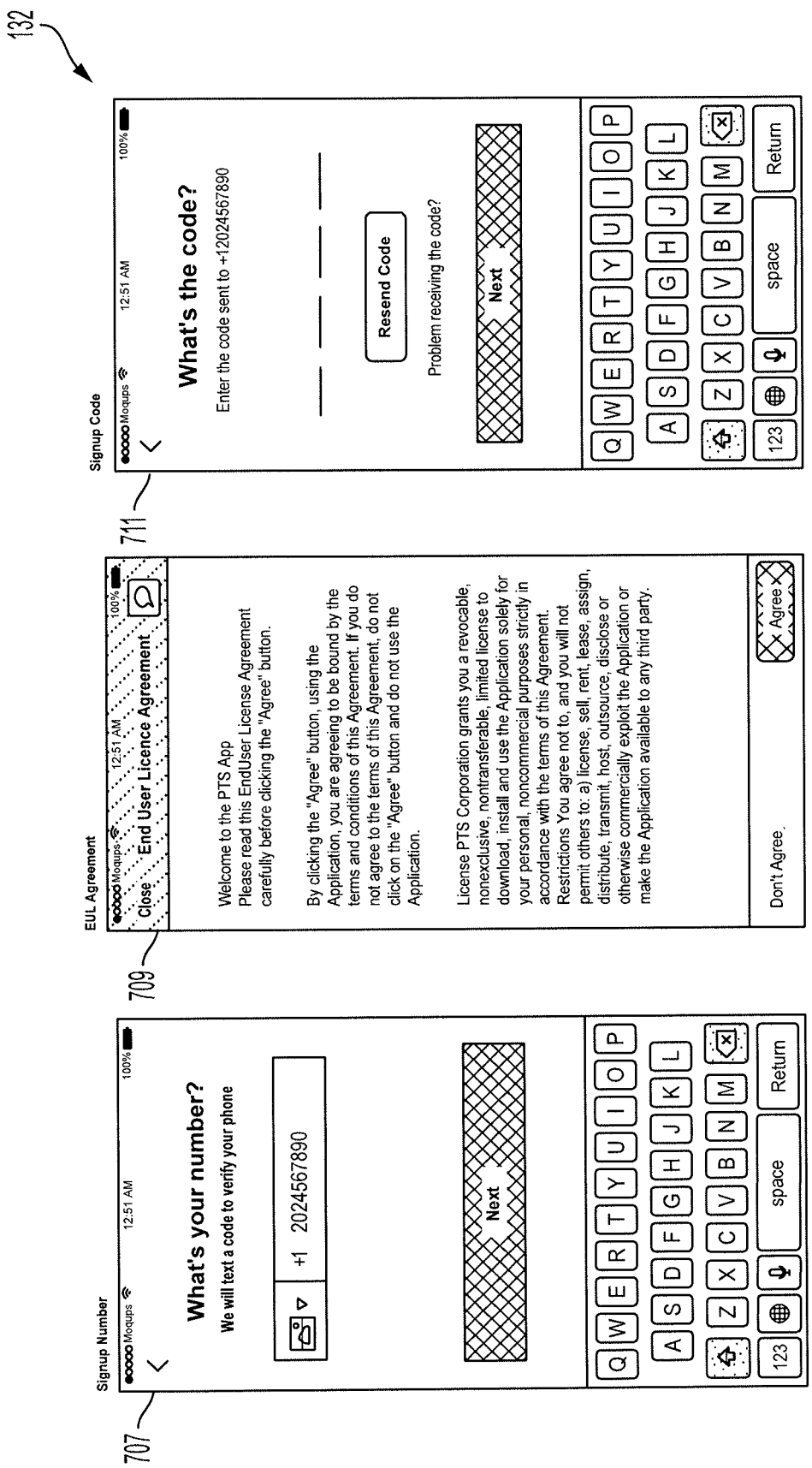

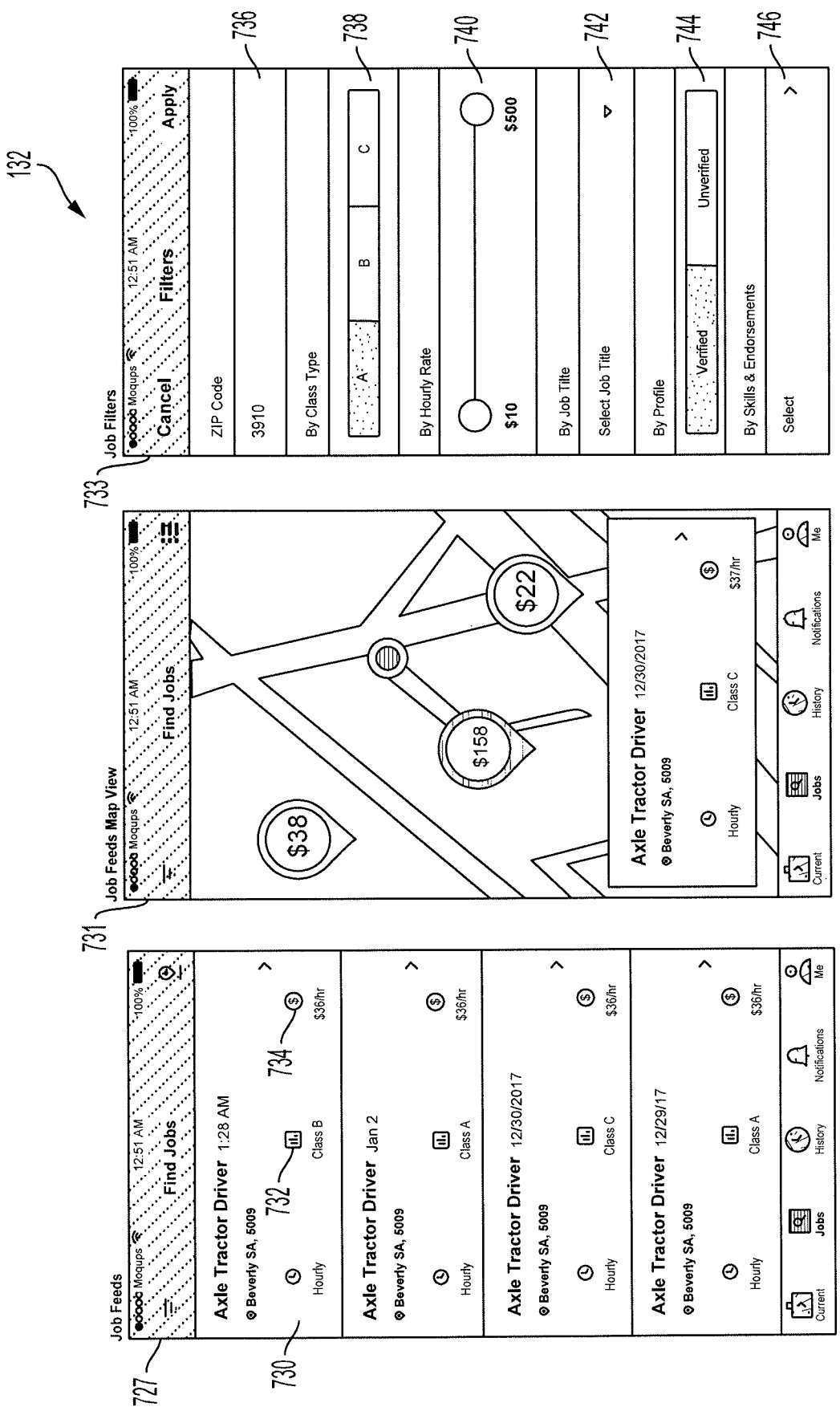

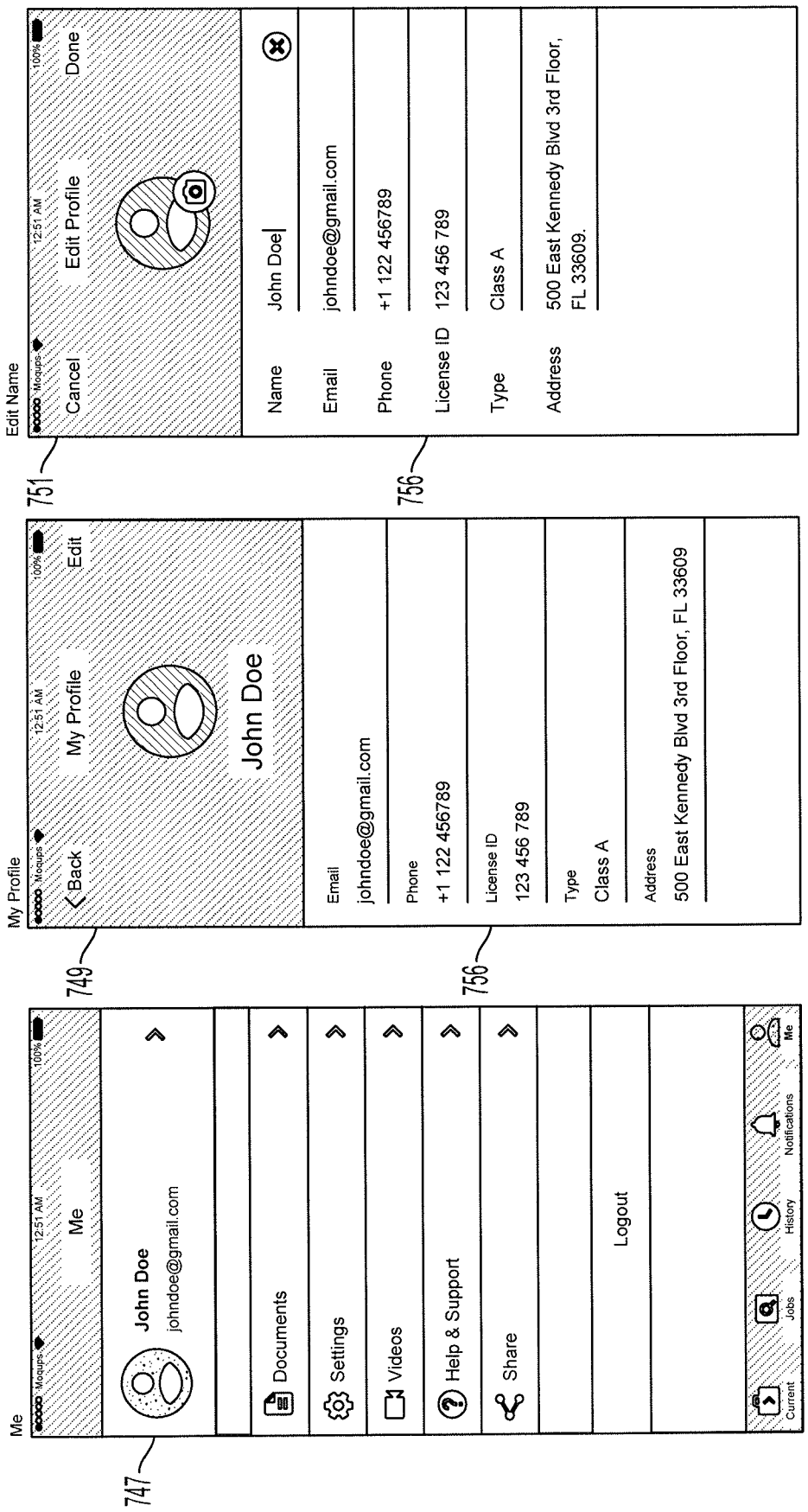

METHOD FOR STAFFING A COMMERCIAL VEHICLE WITH A DRIVER

CROSS REFERENCE TO RELATED APPLICATIONS

This application claims the benefits of provisional application Ser. No. 62/780,797, filed Dec. 17, 2018 for Method for Staffing a Commercial Vehicle with a Driver and is incorporated by reference herein.

BACKGROUND

1. Field

This specification relates to systems and methods for staffing a commercial vehicle with a driver.

2. Description of the Related Art

Many transport companies, throughout the course of their business, need additional drivers in order to fulfill their transport orders. These transport companies may not have the resources or long-term need to hire additional fulltime drivers but may occasionally need additional drivers on a temporary basis. For example, a transport company may suddenly need two additional drivers to staff their commercial vehicles after going months without the need. Due to the volatility of this need, it does not make fiscal sense for a transport company to overstaff themselves with additional drivers to cover this sporadic and unpredictable need.

Additionally, there is a vast number of qualified truck drivers that may be semi-retired, collecting social security, or looking to make some extra money but do not want to take a full-time position at a transport company.

SUMMARY

Disclosed here is a method for staffing a commercial vehicle with a driver. The method includes sending to a server, by a dispatch computing device associated with a job dispatcher, a job order to staff a commercial vehicle with a driver, the job order having one or more driver qualifications, the job dispatcher being associated with a transport company. The method further includes receiving, from a driver computing device associated with the driver, an identification of the driver and one or more driver qualifications. The method further includes verifying, by the server, the one or more driver qualifications in response to receiving the identification of the driver and the one or more driver qualifications. The method further includes granting, by the server, the driver access to request assignment to the job order when the one or more driver qualifications are verified. The method further includes receiving, from the driver computing device, a request to be assigned to the job order. The method further includes assigning, by the dispatch computing device, the job order to the driver by accepting the request received from the driver computing device.

Also disclosed is a method for staffing a temporary job with an employee, the temporary job requiring at least one qualification. The method includes sending to a server, by an employer computing device associated with an employer, a job order to staff the temporary job with the employee, the job order having one or more qualifications. The method further includes receiving, from an employee computing device associated with the employee, an identification of the employee and one or more employee qualifications. The method further includes verifying, by the server, the one or more employee qualifications in response to receiving the identification of the employee and the one or more employee qualifications. The method further includes granting, by the server, the employee access to request assignment to the job order when the one or more employee qualifications are verified. The method further includes receiving, from the employee computing device, a request to be assigned to the job order. The method further includes assigning, by the employer computing device, the job order to the employee by accepting the request received from the employee computing device.

Also disclosed is a system for staffing a commercial vehicle with a driver. The system includes a dispatch computing device configured to: transmit a job order to staff a commercial vehicle with a driver, the job order having one or more driver qualifications, the job dispatcher being associated with a transport company, and assign the job order to the driver when the driver is authorized. The system further includes a driver computing device configured to transmit an identification of the driver and one or more driver qualifications, and to transmit a request to be assigned to the job order. The system further includes a server in communication with the dispatch computing device and the driver computing device and configured to: authorize the driver when the one or more driver qualifications is verified in response to receiving the identification of the driver and the one or more driver qualifications, and grant the driver access to request assignment to the job order when the one or more driver qualifications are verified.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems and methods for staffing a commercial vehicle with a driver. Many transport companies have a need for day-to-day commercial truck drivers to haul various products in the company owned commercial vehicles. These companies may not wish to hire fulltime drivers. Some may only desire to staff their day-to-day needs should a need arise, and some may prefer the arrangement of having fewer fulltime staff on their payroll. Similarly, there are many qualified commercial truck drivers that want to earn a supplemental income but do not want fulltime work. Some of these drivers may prefer the freedom to work when they desire, or may want the freedom to work with multiple transport companies. Thus, the disclosed systems and methods for staffing a commercial vehicle with a driver allows these transport companies to fulfill their daily staffing needs with this large and untapped workforce of qualified commercial truck drivers, and similarly allows drivers the freedom to work with various companies and based on their desired work schedule.

Although the present disclosure is directed to staffing commercial drivers, the present disclosure may likewise be used to staff any jobs in which specific certifications are required of employees. For example, the present disclosure may be used to staff educational institutions (e.g., schools) with teachers having specific certifications. Likewise, the present disclosure may be used to staff hair salons with beauticians having specific certifications.

Figure 1:
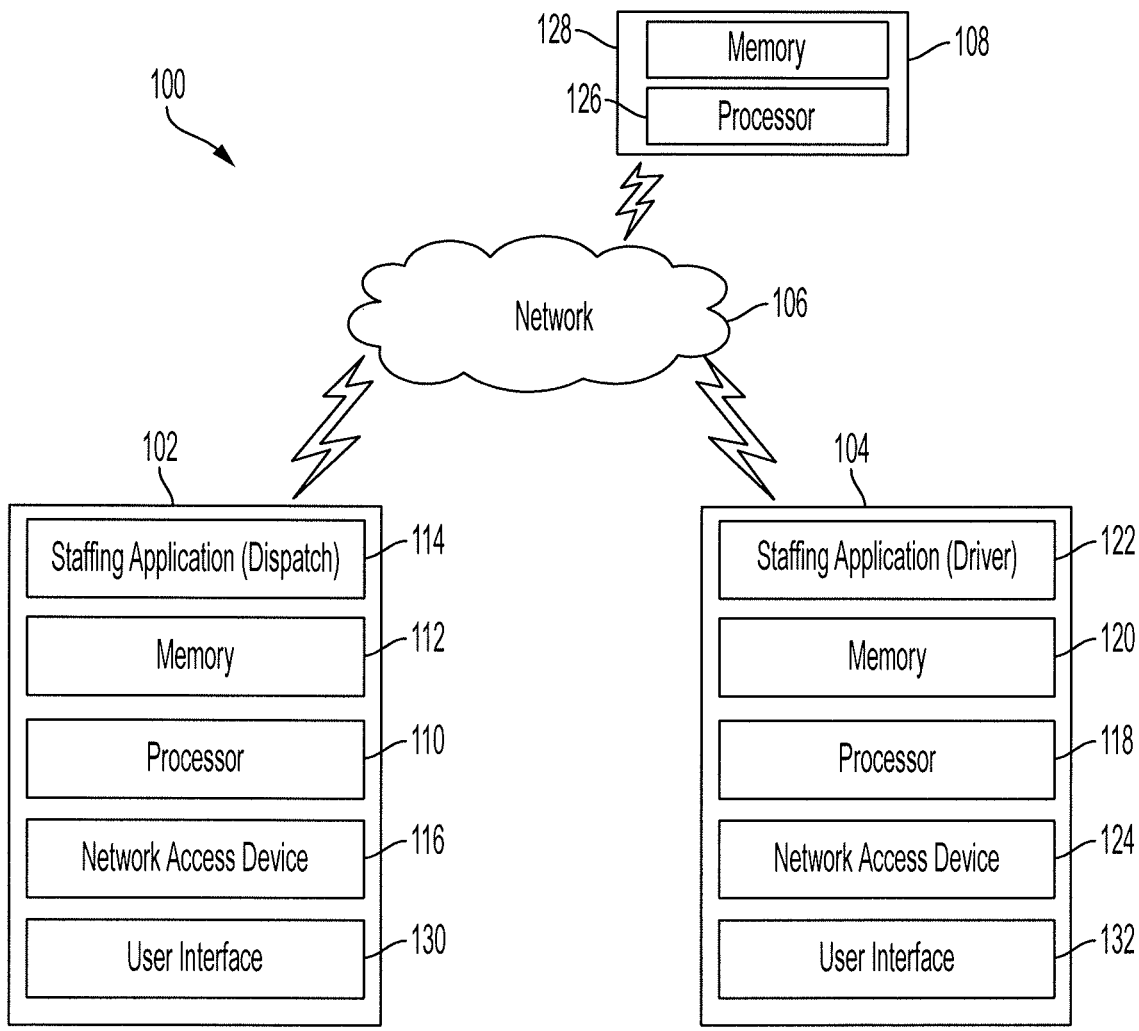
FIG. 1 shows an example block diagram of a commercial vehicle staffing system according to an aspect of the invention.

FIG. 1 illustrates a block diagram of a commercial vehicle staffing system 100. The commercial vehicle staffing system 100 may include a dispatch computing device 102 (or an employer computing device) associated with a job dispatcher (or employer) and a driver computing device 104 (which may also be referred to as an employee computing device) associated with a driver (or a temporary employee). The job dispatcher may be associated with a transport company, or a company that has goods to be transported from time to time. In various embodiments, the job dispatcher may be associated with a company that owns or operates commercial vehicles. The driver may include a commercial driver (e.g., a user having a commercial drivers license (CDL)), and may have one or more endorsements (e.g., tank vehicle endorsement, hazardous materials endorsement, etc.). In various embodiments, the dispatch computing device 102 may include any computing device such as a laptop computer, a desktop computer, a tablet, a mobile device (e.g., a mobile phone), a dedicated computing device for requesting drivers, or the like. In various embodiments, the driver computing device 104 may include any computing device such as a laptop computer, a desktop computer, a tablet, a mobile device, a dedicated computing device for requesting jobs, or the like.

The commercial vehicle staffing system 100 may also include a server 108. Although various functions or operations are described as being performed by a specific one of the server 108, the dispatch computing device 102, or the driver computing device 104, one skilled in the art will realize that in some embodiments, functions that are described as functions performed by the server 108 may also or instead be performed by at least one of the dispatch computing device or the driver computing device 104. Similarly and in some embodiments, functions that are described as functions performed by the dispatch computing device 102 (or the driver computing device 104) may also or instead be performed by at least one of the server 108 or the driver computing device 104 (or the dispatch computing device 102).

The various components of the system 100, such as the dispatch computing device 102, the driver computing device 104, and the server 108, may communicate with each other via the network 106. For example, the network 106 may include the internet, may include a wired (e.g., Ethernet) or wireless (e.g., Bluetooth or Wi-Fi) network, may include a public or private network, or the like.

The server 108 may have a processor 126 and a memory 128. In various embodiments, the server 108 may be protected by a firewall in order to protect potentially sensitive information communicated to or by the server 108, information stored on the server, or any other information received or transmitted by the server 108.

The dispatch computing device 102 may have a staffing application 114 loaded thereon. The dispatch computing device 102 may download the staffing application 114 from the server 108, from the internet, or from any other available source (e.g., an app store). In various embodiments, the dispatch computing device 102 may be provided with the staffing application 114 preloaded thereon. In that regard, the dispatch computing device 102 may be a specialized hardware component designed to perform the functions described herein. The dispatch computing device 102 may include a processor 110, a non-transitory memory 112, and a network access device 116. The staffing application 114 may include or utilize a user interface 130 that receives input from a user, such as a job dispatcher, and outputs data to the user.

The staffing application 114 may be stored in the memory 112. The memory 112 may store instructions that are executable by the processor 110 and may include one or more of a random-access memory (RAM), read-only memory (ROM), or other volatile or non-volatile non-transitory data storage device. The memory 112 may be a non-transitory memory or a data storage device, such as a hard disk drive, a solid-state disk drive, a hybrid disk drive, or other appropriate data storage, and may further store machine-readable instructions, which may be loaded and executed by the processor 110. The memory 112 may be encrypted in order to protect potentially sensitive information stored thereon.

The staffing application 114 may at least one of include, interface with, or interact with a user interface 130. The user interface 130 may include any device or component capable of receiving user input (such as a button, a dial, a microphone, a graphical user interface, or a touch screen), and any device capable of outputting data (such as a display, a speaker, a refreshable braille display). In various embodiments, the user interface 130 may include a combination device such as a touchscreen. The user interface 130 allows a user (e.g. a job dispatcher) to interface with the staffing application 114. For example, the user (e.g. the job dispatcher) may be able to provide data to the staffing application 114 such as user input, and/or receive feedback from the staffing application 114 via the user interface 130.

The network access device 116 may include a communication port or channel, such as one or more of a Wi-Fi unit, a Bluetooth® unit, a radio frequency identification (RFID) tag or reader, or a cellular network unit for accessing a cellular network (such as 3G, 4G, 5G, or the like). The staffing application 114 may communicate with at least one of the driver computing device 104 or the server 108 through the network 106. The network 106, such as Bluetooth Low Energy (BLE) network, a local area network (LAN), a wide area network (WAN), a cellular network, the Internet, or combination thereof, connects the dispatch computing device 102 to at least one of the driver computing device 104 or the server 108.

The commercial vehicle staffing system 100 includes the driver computing device 104. The driver computing device 104 may have a staffing application 122 loaded thereon. The driver computing device 104 may download the staffing application 122 from the server 108, from the internet, from an app store, or the like. In various embodiments, the driver computing device 104 may be provided with the staffing application 122 preloaded thereon. In that regard, the driver computing device 104 may be a specialized hardware component designed to perform the functions described herein.

The driver computing device 104 may include a processor 118, a non-transitory memory 120, and a network access device 124. The driver computing device 104 may include or be coupled to a user interface 132 designed to receive input from a user, such as a driver, and to output data to the user.

In various embodiments, the staffing application 122 and the staffing application 114 may be the same application. In other embodiments, the staffing application 122 may be a specialized application for drivers and the staffing application 114 may be a specialized application for job dispatchers.

The staffing application 122 may be stored in the memory 120. The memory 120 may store instructions executable by the processor 118 and may include one or more of a RAM, a ROM, or any other volatile or non-volatile memory non-transitory memory or data storage device. The memory 120 may be a non-transitory memory or a data storage device, such as a hard disk drive, a solid-state disk drive, a hybrid disk drive, or other appropriate data storage, and may further store machine-readable instructions, which may be loaded and executed by the processor 118.

The staffing application 122 may at least one of include, interface with, or interact with the user interface 132. The user interface 132 may include any device or component capable of receiving user input (such as a button, a dial, a microphone, a graphical user interface, or a touch screen), and any device capable of outputting data (such as a display, a speaker, a refreshable braille display). In various embodiments, the user interface 132 may include a combination device such as a touchscreen. The user interface 132 allows a user (e.g. a driver) to interface with the staffing application 122. For example, the user (e.g. the driver) may provide data to the staffing application 122 such as user input, and/or may receive feedback from the staffing application 122 via the user interface 132.

The network access device 124 may include a communication port or channel, such as one or more of a Wi-Fi unit, a Bluetooth® unit, a radio frequency identification (RFID) tag or reader, or a cellular network unit for accessing a cellular network (such as 3G, 4G, 5G, or the like). The staffing application 122 may communicate with at least one of the dispatch computing device 102 or the server 108 through the network 106. The network 106, such as Bluetooth Low Energy (BLE) network, a local area network (LAN), a wide area network (WAN), a cellular network, the Internet, or combination thereof, may connect the driver computing device 104 to at least one of the dispatch computing device 102 or the server 108.

Figure 2:
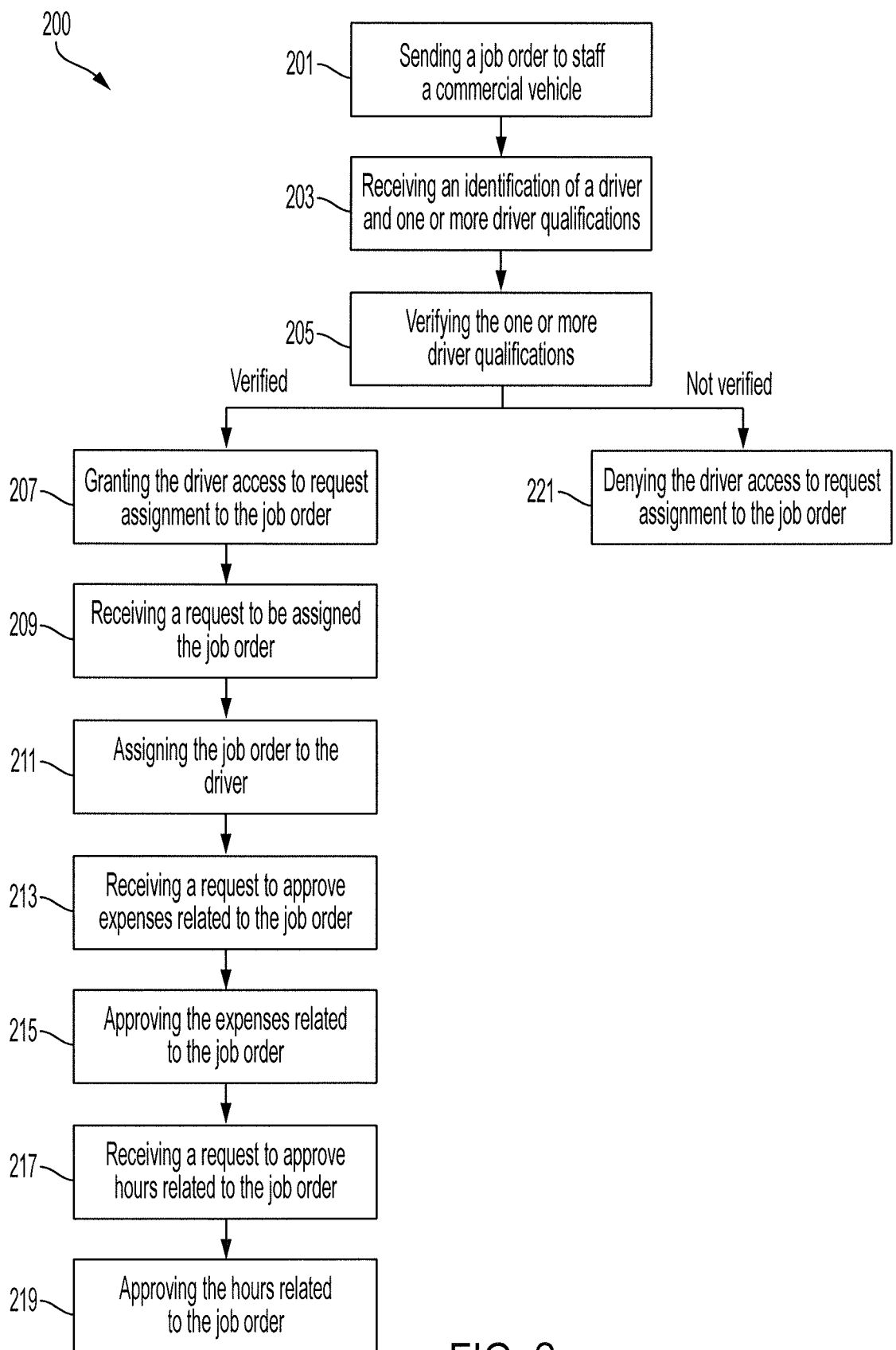
FIG. 2 is a flow diagram of an example process implemented by the dispatch computing device, the driver computing device, and the server of FIG. 1 according to an aspect of the invention.

FIG. 2 is a flow diagram of a process 200 implemented by the dispatch computing device 102, the driver computing device 104, and the server 108 within the commercial vehicle staffing system 100.

Referring to FIGS. 1 and 2, a user (e.g. job dispatcher) may log into the staffing application 114 and create a job order to staff a commercial vehicle with a driver. In various embodiments, the job dispatcher may utilize the staffing application 114 to indicate whether a driver is needed to drive an available truck that is owned by the job dispatcher, or to indicate whether a driver with their own truck is needed (e.g., if no commercial vehicle is available to the company associated with the job dispatcher).

The user may use the user interface 130 on the dispatch computing device 102. The job order may include one or more driver qualifications or endorsements for the specific job order. The one or more driver qualifications or endorsements may include evidence of vehicle insurance, driver insurance, a commercial driver's license (CDL), or specific endorsements such as hazardous materials endorsement. The one or more driver qualifications or endorsements may further include whether a CDL for a specific state or states is needed for the job order. The CDL may be a Class A or a Class B license. In other embodiments, the CDL may any form of commercial driver's license issued by a governmental agency. The dispatch computing device 102 may send the job order to staff a commercial vehicle to the server 108 (201). The server 108 may include listings of one or more job orders that are available for drivers to apply for.

A driver may log into the staffing application 122 to request assignment to one or more job orders located on the server 108. The driver may use the user interface 132 on the driver computing device 104 to make such requests. In order to be eligible to request assignment to the one or more job orders, the driver may need to at least one of enter or upload their identification and one or more driver qualifications or endorsements to the server 108 using the user interface 132. The identification of the driver may include a name, an e-mail address, a phone number, a social security number, a living address, or a business address. The driver may at least one of enter or upload their identification and one or more driver qualifications or endorsements to the server 108. The server 108 may receive the identification of the driver and the one or more driver qualifications from the driver computing device 104 (203).

The server 108 may verify the one or more driver qualifications or endorsements received from the driver computing device 104 (205). In some embodiments, verifying the one or more driver qualifications may include verifying that the one or more driver qualifications have not expired. In other embodiments, verifying the one or more driver qualifications may include verifying the one or more driver qualifications with the issuing agency. For example, the server 108 may verify with a specific department of motor vehicles (DMV) that the driver's Class C license is valid and unexpired, and that the driver's hazardous materials endorsement is valid and unexpired. For example, the server 108 may connect with the specific DMV via the network 106 and retrieve the qualifications and/or endorsements from the specific DMV computing system, or may transmit the qualifications and/or endorsements that were provided by the driver to the specific DMV computing system and ask for validation. The server 108 may then receive validation of the qualifications and/or endorsements, or may validate the qualifications/endorsements based on the received information from the specific DMV computing system.

The server 108 may grant the driver access to request assignment to the job order when the one or more driver qualifications are verified (207). Stated differently, the driver may apply to one or more assignment after the qualifications or endorsements are verified or validated. In various embodiments, the driver may be able access the one or more job orders on the server 108 as a result of the one or more driver qualifications being verified. In other embodiments, the driver may be able to only access the one or more job orders on the server 108 that are fulfilled by the at least one of entered or uploaded one or more driver qualifications. For example, if the driver lacks a hazardous materials endorsement then any job orders that require a hazardous materials endorsement may be unavailable for the driver to view.

The server 108 may deny the driver access to request assignment to the job order when the one or more driver qualifications are not verified (221). In some embodiments, the driver may not be able access the one or more job orders on the server 108 as a result of the one or more driver qualifications not being verified. In other embodiments, the driver may be able to access the one or more job orders on the server 108 but may be denied the ability to request assignment to the one or more job orders on the server 108. In some embodiments, the driver may appeal the lack of verification. For example, the driver may call a number associated with a company that operates the server 108 and request human verification of the qualifications and/or endorsements. A human may contact a specific DMV office to determine whether the provided documents regarding the qualifications and/or endorsements are valid. If the human operator determines that the qualifications and/or endorsements are valid then the human may change the status of the verification to verified on the server 108.

The driver may select a job order on the server 108 and then request to be assigned the job order using the driver computing device 104. The server 108 may receive the request to be assigned the order and relay the request to the dispatch computing device 102. The dispatch computing device 102 may then receive the request from the driver computing device 104 to be assigned to the job order (209).

The dispatch computing device 102 may assign the job order to the driver by accepting the request received from the driver computing device 104 (211). In some embodiments, the job order may be assigned to the driver by the job dispatcher. In other embodiments, the job order may be assigned automatically to the driver based on an algorithm. For example, the algorithm may factor in various metrics such as the driver's experience, the driver's rating, the driver's distance from the job dispatcher, the number of hours the driver has worked, the number of miles the driver has driven, the driver's driving record, other jobs that the driver has upcoming, a number of miles or hours on the upcoming jobs of the driver, or the driver's insurance rating/score. Other metrics may be used interchangeably according to various embodiments. The algorithm may factor in at least one of the above metrics or additional metrics that are entered in by the job dispatcher through the user interface 130.

After the job order has been assigned to the driver, the driver may staff the commercial vehicle. During the course of fulfilling the job order, the driver may incur expenses related to the job order. The driver may enter the request for the job dispatcher to approve these expenses through the user interface 130 and upload the request onto the server 108. The server 108 may relay the request to the dispatch computing device 102. The dispatch computing device 102 may receive the request to approve expenses related to the job order from the driver computing device 104 (213).

The dispatch computing device 102 may approve the expenses related to the job order (215). In some embodiments, the expenses may be approved by the job dispatcher. In other embodiments, the expenses may be automatically approved by the dispatch computing device 102 when at least one of the expenses fall within a predetermined budget set by the job dispatcher, the expenses are incurred within a predetermined distance of the route associated with the job order, the expenses are incurred at a preauthorized institution, or the like.

The driver may enter and upload the hours worked while fulfilling the job order and submit a request for the job dispatcher to approve these hours through the user interface 130 and onto the server 108. The server 108 may relay the request to the dispatch computing device 102. The dispatch computing device 102 may receive a request to approve hours related to the job order from the driver computing device 104 (217).

The dispatch computing device 102 may approve the hours related to the job order (219). In some embodiments, the hours may be approved by the job dispatcher. In other embodiments, the hours may be automatically approved by the dispatch computing device 102 when the hours fall within a predetermined time limit set by the job dispatcher.

The staffing application 122 may monitor when the driver is on the road or moving along the route to generate monitoring data. The monitoring data may include the monitored hours and the monitored location associated with the job order. The staffing application 122 may send the monitoring data to the dispatch computing device 102 to approve or deny the monitored hours. In some embodiments, the dispatch computing device 102 may automatically approve or deny the monitored hours based on at least one of an expected time of completion, an expected progress of completion, the monitored location of the driver (e.g., whether the driver is moving and whether the movement is along an expected route), or the like. For example, the dispatch computing device 102 may automatically deny the monitored hours if, during a portion of the job order, the driver took 2 hours when that portion of the job order should have only taken 15 minutes. In another example, the dispatch computing device 102 may automatically deny the monitored hours because the driver submits that the job order took 2 hours but the monitored hours and the monitored location shows that the job order only took 30 minutes to complete from starting location to ending location. In another example the dispatch computing device 102 may automatically deny the monitored hours because the driver took a route that is determined by the dispatch computing device 102 (or the server 108) to be a slower route.

Figure 3:
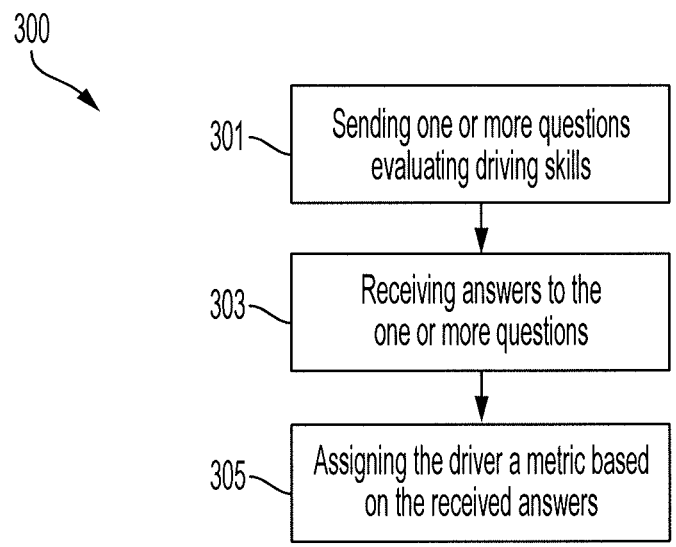
FIG. 3 is a flow diagram of an example process implemented by the server of FIG. 1 according to an aspect of the invention.

FIG. 3 is a flow diagram of a process 300 implemented by server 108 within the commercial vehicle staffing system 100.

Referring to FIGS. 1 and 3, the server 108 may send to the driver computing device 104 one or more questions evaluating driving skills (301). At least some of the one or more questions may pertain to testing the driver with regard to the various driving rules or laws in the country or state the driver is qualified to drive in. Some of the one or more questions may pertain to testing the driver regarding best practices. The server 108 may send the one or more questions to the driver computing device 104 on a regular scheduled basis. For example, the server 108 may send the one or more questions to the driver computing device 104 on a monthly or quarterly basis. However, other time intervals may be used interchangeably according to various embodiments.

Upon receiving the one or more questions, the driver may have a predetermined time limit to submit their answers. For example, the driver may have 15 minutes or 24 hours to submit their answers. However, other time limits may be used interchangeably according to various embodiments.

After the one or more questions have been received by the driver computing device 104, the driver may be denied the ability to request to be assigned a job order until the answers are submitted to the server 108.

The server 108 may receive the answers to the one or more questions from the driver computing device 104 (303). The server 108 may assign the driver a metric based on the accuracy of the received answers to the one or more questions (305). In some embodiments, the server 108 may deny the driver the ability to request to be assigned a job order when the received answers fall below a predetermined accuracy percentage. For example, the driver may be denied access to the server 108 if less than 50% of the answers are correct.

Figure 4:
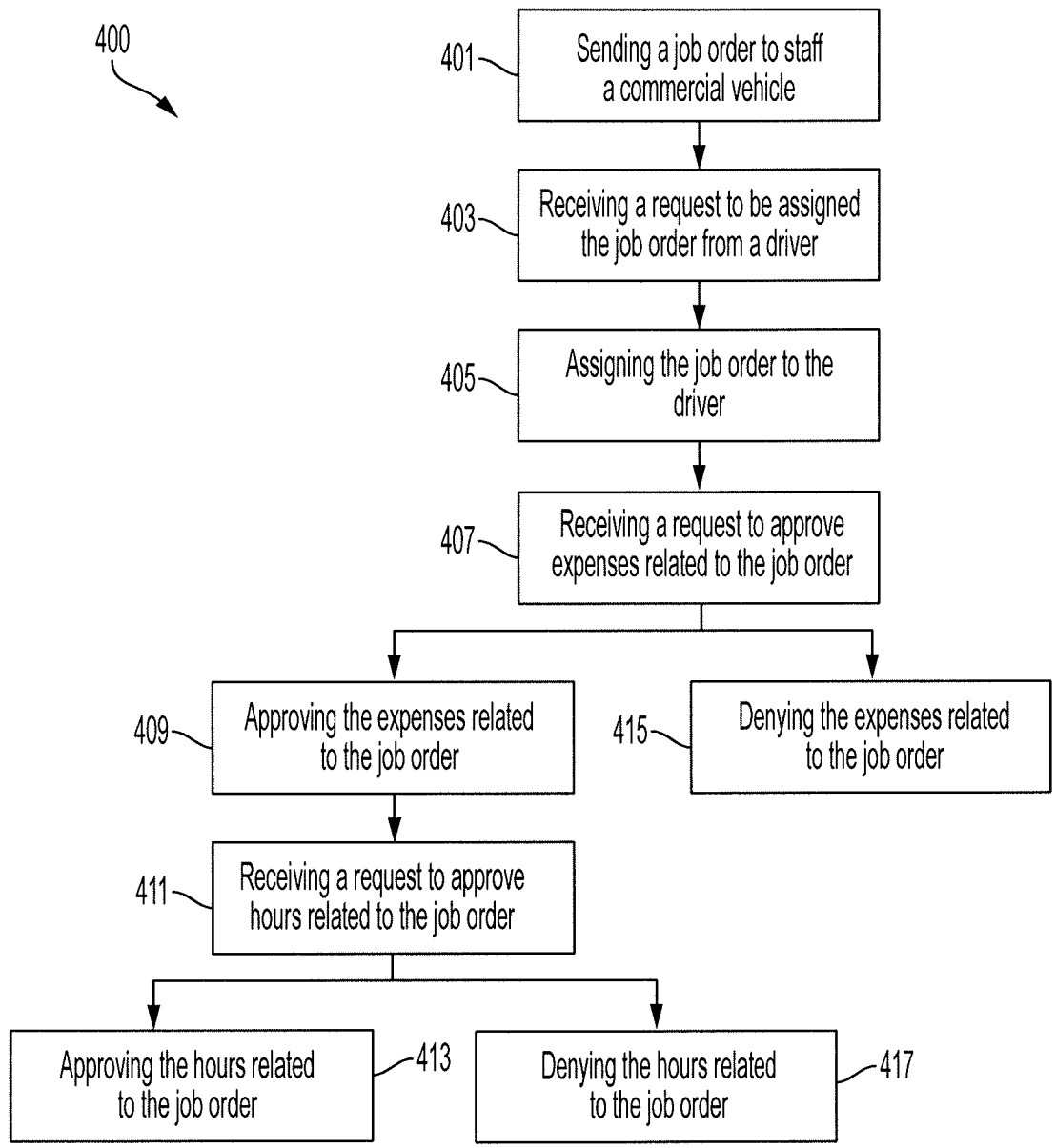
FIG. 4 is a flow diagram of an example process implemented by the dispatch computing device of FIG. 1 according to an aspect of the invention.

FIG. 4 is a flow diagram of a process 400 implemented by the dispatch computing device 102 within the commercial vehicle staffing system 100.

Referring to FIGS. 1 and 4, a user (e.g. job dispatcher) may log into the staffing application 114 and create a job order to staff a commercial vehicle with a driver. The user may use the user interface 130 on the dispatch computing device 102. The job order may include one or more driver qualifications or endorsements. The one or more driver qualifications may include evidence of vehicle insurance, driver insurance, a commercial driver's license (CDL), a specific endorsement for the driver, or whether the driver needs to supply his or her own truck. The CDL may be a Class A or a Class B license. In other embodiments, the CDL may any form of commercial driver's license issued by a governmental agency. The dispatch computing device 102 may send the job order to staff a commercial vehicle to the server 108 (401). The server 108 may include listings of one or more job orders for drivers to apply for. In various embodiments, certain qualifications or endorsements may be automatically applied to certain jobs. For example, every job order may require driver insurance, or every job order from a specific company may require a hazardous materials endorsement. In that regard, automatically including such qualifications or endorsements (which may be personalized for certain job dispatchers) may save the dispatcher time when preparing job orders to be fulfilled.

The dispatch computing device 102 may receive the request from the driver computing device 104 to be assigned to the job order (403). The dispatch computing device 102 may assign the job order to the driver by accepting the request received from the driver computing device 104 (405). In some embodiments, the job order may be assigned to the driver by the job dispatcher. In other embodiments, the job order may be assigned automatically to the driver based on an algorithm implemented in the server 108 or the dispatch computing device 102. For example, the algorithm may factor in various metrics such as the driver's experience, the driver's rating, the driver's distance from the job dispatcher, the number of hours the driver has worked, the number of miles the driver has driven, the driver's driving record, or the driver's insurance rating/score. Other metrics may be used interchangeably according to various embodiments. The algorithm may factor in at least one of the above metrics or additional metrics that are entered in by the job dispatcher through the user interface 130.

In various embodiments, drivers may set their hourly rate and, in some embodiments, job dispatchers may set an hourly rate for each job. The hourly rates may be based on metrics such as qualifications, endorsements, difficulty of specific routes, or the like. In some embodiments, one or more of the server 108, the driver computing device 104, or the dispatch computing device 102 may set the driver's hourly rate or the job hourly rate based on an algorithm that takes into account such metrics as described above. In that regard, one or more of the server 108, the driver computing device 104, and the dispatch computing device 102 may match drivers to jobs based not only on qualifications, endorsements, and other factors discussed above, but also based on the hourly rates. For example, if two jobs are available that match a driver's criteria, the driver computing device 104 may select a job for the driver that offers the greater hourly rate. Similarly, if two drivers apply for a specific job, the dispatch computing device 102 may select the driver with the lower hourly rate.

The dispatch computing device 102 may receive a request to approve expenses related to the job order from the driver computing device 104 (407). The dispatch computing device 102 may approve the expenses related to the job order (409). In some embodiments, the expenses may be approved by the job dispatcher. In other embodiments, the expenses may be automatically approved by the dispatch computing device 102 when at least one of the expenses fall within a predetermined budget set by the job dispatcher, the location of the expenses occur along the route, the expense occurs at a preauthorized institution (e.g., a British Petroleum gas station which may have an agreement with the job dispatcher), or the like.

The dispatch computing device 102 may deny the expenses related to the job order (415) in some situations. In some embodiments, the expenses may be denied by the job dispatcher. In other embodiments, the expenses may be automatically denied by the dispatch computing device 102 when the expenses fall outside a predetermined budget set by the job dispatcher or based on other considerations. For example, if the expense is located more than a predetermined distance from the route (e.g., 5 miles away from the nearest point on the route), the expense may be automatically rejected by the dispatch computing device.

The dispatch computing device 102 may receive a request to approve hours related to the job order from the driver computing device 104 (411). The dispatch computing device 102 may approve the hours related to the job order (413). In some embodiments, the hours may be approved by the job dispatcher. In other embodiments, the hours may be automatically approved by the dispatch computing device 102 when the hours fall within a predetermined time limit set by the job dispatcher.

The dispatch computing device 102 may deny the hours related to the job order (417) in some situations. In some embodiments, the hours may be denied by the job dispatcher rather than the dispatch computing device. In some embodiments, the hours may be automatically denied by the dispatch computing device 102 when the hours fall outside a predetermined time limit set by the job dispatcher, or under other circumstances (e.g., the driver backtracked along the route, took an unauthorized route to a destination, or the like).

Figure 5:
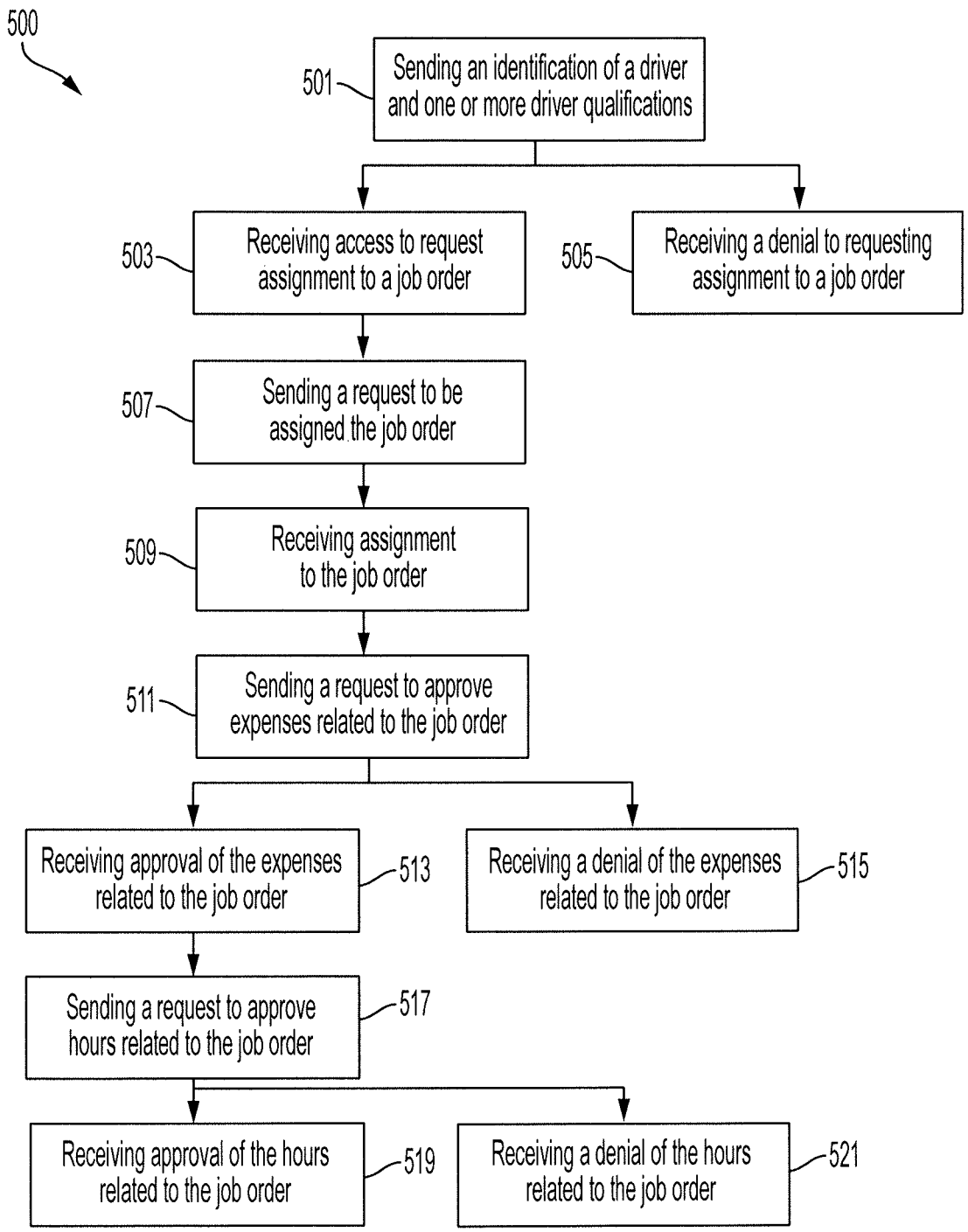
FIG. 5 is a flow diagram of an example process implemented by the driver computing device of FIG. 1 according to an aspect of the invention.

FIG. 5 is a flow diagram of a process 500 implemented by the driver computing device 104 within the commercial vehicle staffing system 100.

Referring to FIGS. 1 and 5, a driver may log into the staffing application 122 to request assignment to one or more job orders located on the server 108. The driver may use the user interface 132 on the driver computing device 104. In order to be eligible to request assignment to the one or more job orders the driver may need to at least one of enter or upload their identification and one or more driver qualifications and/or endorsements to the server 108 through the user interface 132. The identification of the driver may include a name, an e-mail address, a phone number, a social security number, a living address, or a business address. The driver may at least one of enter or upload their identification and one or more driver qualifications to the server 108. For example, the driver may provide identification numbers associated with their qualifications and/or endorsements, or may take photographs of their qualifications and/or endorsements. In some embodiments, the driver may provide information indicating whether the driver has his or her own truck which can be used for transport, and may also provide specifications regarding the truck (e.g., hauling capacity, cargo hold size, whether the cargo hold is refrigerated, etc.).

The server 108 may receive the identification of the driver and the one or more driver qualifications from the driver computing device 104 (501). The server 108 may validate or verify the qualifications and/or endorsements. For example, the server 108 (or the dispatch computing device 102) may compare the name, identification numbers, or images of the qualifications/endorsements to a specific DMV database to verify the authenticity and expiration dates of the qualifications and/or endorsements to ensure they are valid and unexpired. As another example, a user at the server 108 (or at the dispatch computing device 102) may manually compare the identification numbers, names, or images to information at the specific DMV office to validate the qualifications/endorsements.

The driver may receive access to request assignment to a job order from the server 108 (503). In some embodiments, the driver may be able to access the one or more job orders upon receiving access. In other embodiments, the driver may only be able to access the one or more job orders that the driver's qualifications and/or endorsements satisfy the requirements for. For example, if a job order requires a hazardous materials endorsement then the job order may only be viewable by drivers having a hazardous materials endorsement.

In certain situations, the driver may be denied access to request assignment to a job order from the server 108 (505). In some embodiments, the driver may not be able to access the one or more job orders on the server 108 upon being denied access. In other embodiments, the driver may be able to access the one or more job orders on the server 108 but may be denied the ability to request assignment to the one or more job orders on the server 108.

The driver may send a request to be assigned the job order to the server 108 (507). In response, the driver may receive assignment to the job order (509). If the driver does not receive assignment to the job order, the driver may receive a notification indicating their failed attempt to be assigned. In other embodiments, the driver may not receive a notification when the driver does not receive assignment to the job order.

After the job order has been assigned to the driver, the driver may staff the commercial vehicle (or may take his or her own personal commercial vehicle to a loading facility for loading of the cargo). During the course of fulfilling the job order, the driver may incur expenses related to the job order. The driver may enter and upload a request for the job dispatcher to approve these expenses through the user interface 130 and onto the server 108 (511).

The driver may receive an approval of the expenses related to the job order (513). In some embodiments, the approval may result in the expense amount being added to the reimbursement to the driver. In other embodiments, the approval may result in the driver being reimbursed through a bank account associated with the driver on the staffing application 122.

The driver may receive a denial of the expenses related to the job order (515). In some embodiments, the driver may have to lower the expense amount in response to receiving a denial of the expenses. In some embodiments, the driver may have to provide an explanation for the expense amount before resubmitting the request to approve expenses related to the job order. In some embodiments, the driver may be required to provide evidence of the expense, such as a receipt (e.g., by uploading a photograph of the receipt corresponding to the expense).

The driver may enter and upload a request for the job dispatcher to approve hours worked while fulfilling the job order through the user interface 130 and onto the server 108 (517). The driver may receive an approval of the hours worked related to the job order (519). In some embodiments, the approval may result in the driver being reimbursed through a bank account associated with the driver on the staffing application 122.

The driver may receive a denial of the hours worked related to the job order (521). In some embodiments, the driver may have to lower the number of hours in response to receiving the denial of the hours worked. In other embodiments, the driver may have to provide an explanation for the number of hours worked before resubmitting the request to approve expenses related to the job order.

Figures 6H, 6I, 6J:
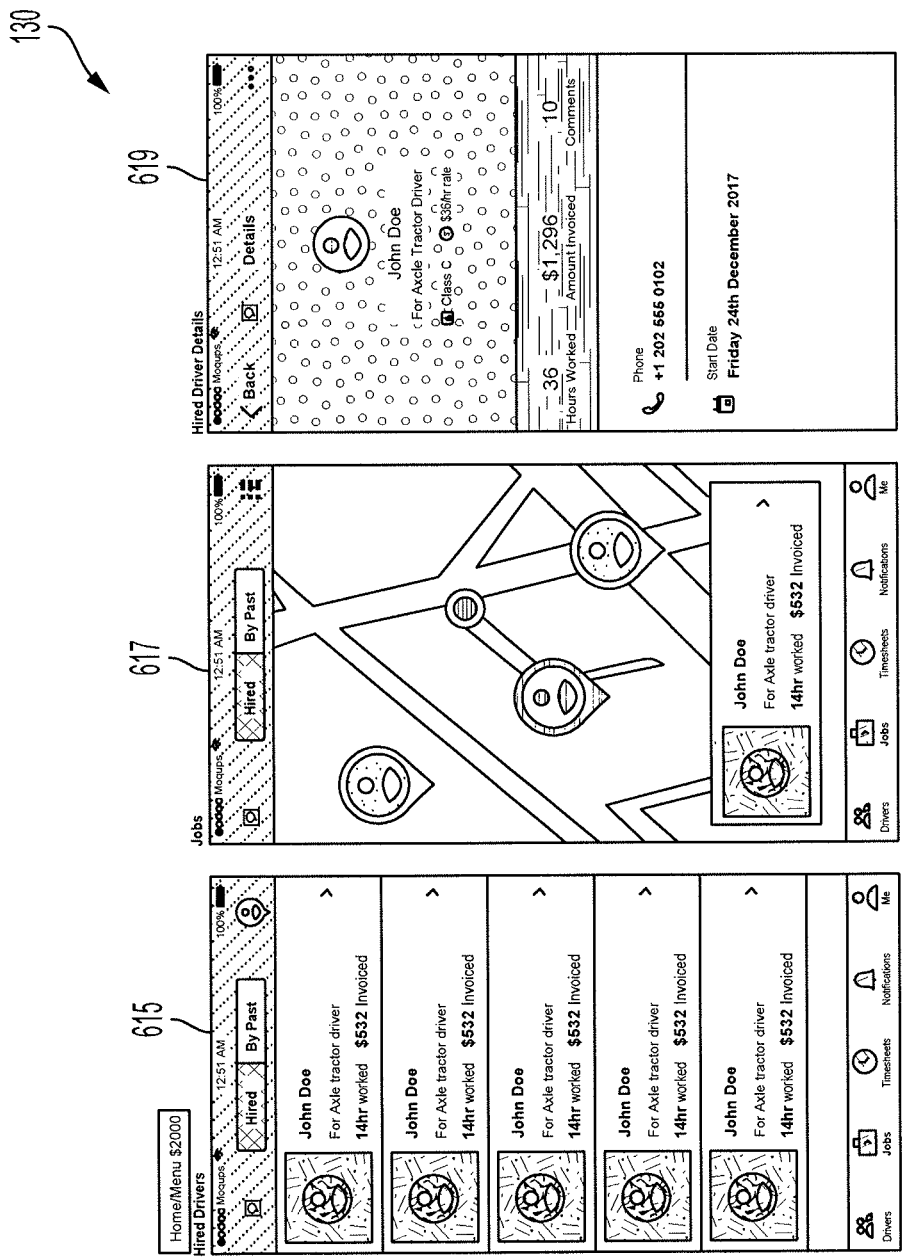
FIGS. 6A-6AA shows example wireframe screens within the user interface of the dispatch computing device of FIG. 1 according to an aspect of the invention.
Figures 6O, 6P, 6Q:
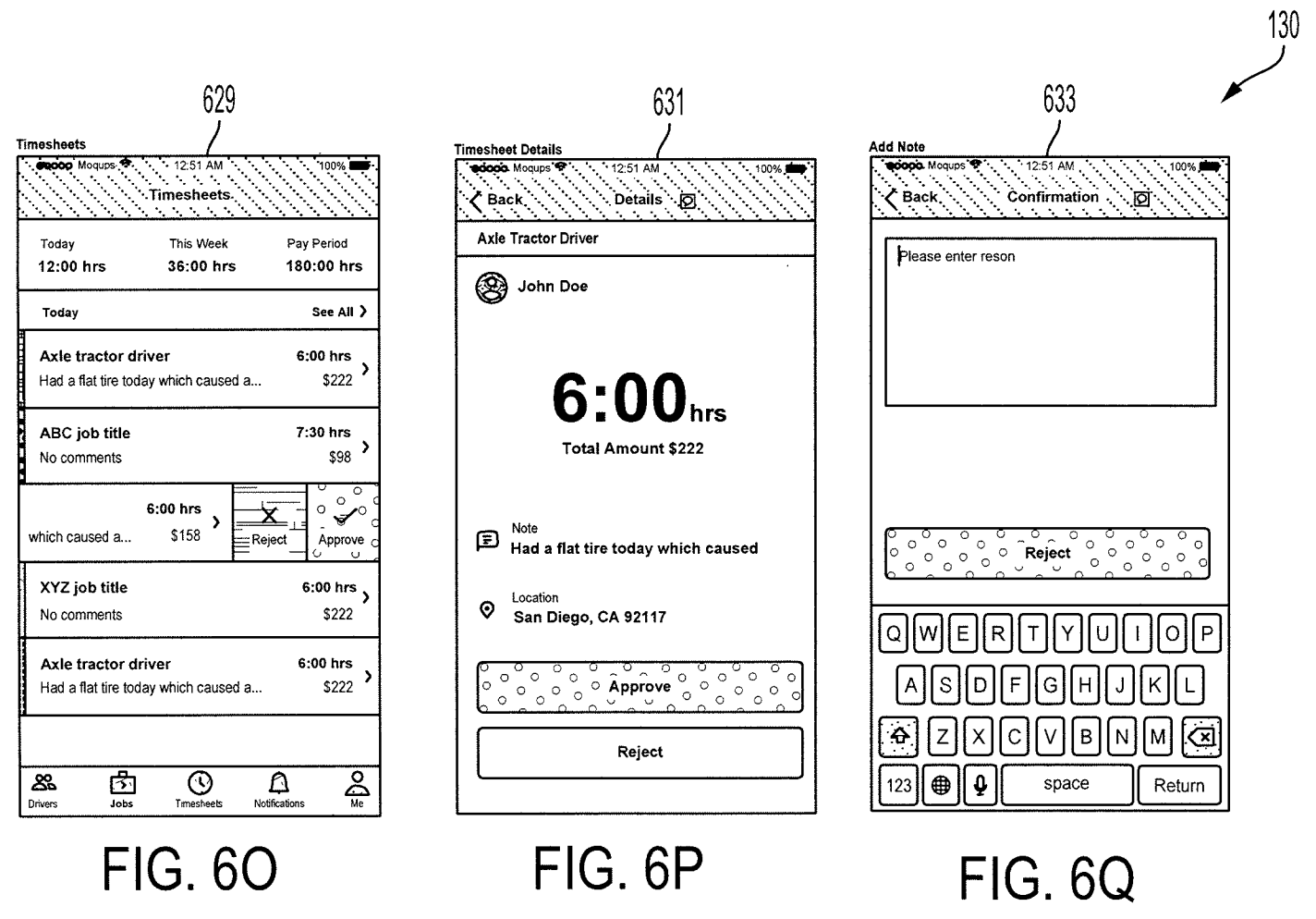
Figure 6T:
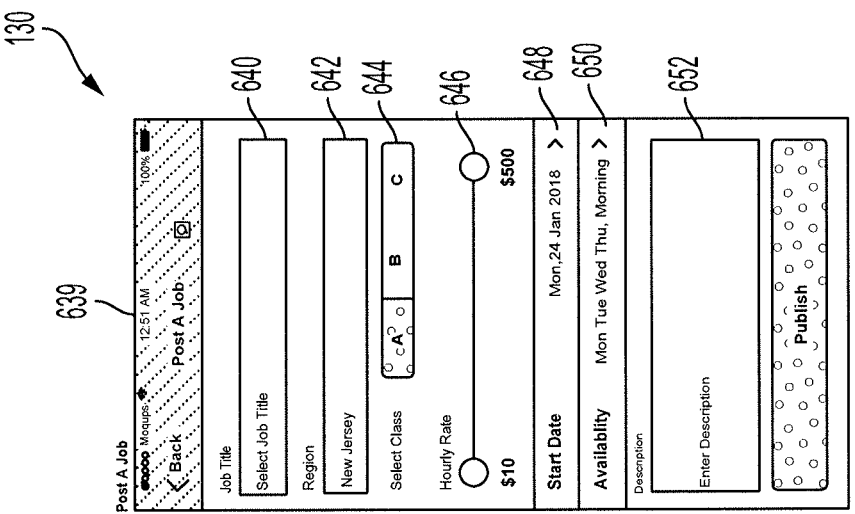
Figure 6S:
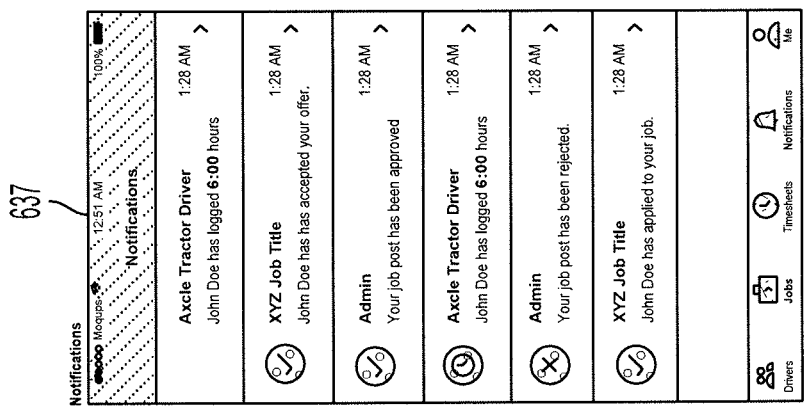
Figure 6R:
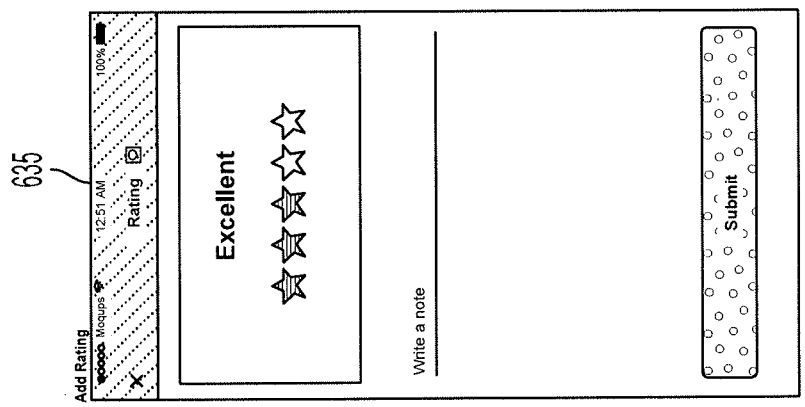
Figures 6A, 6Y, 6Z:
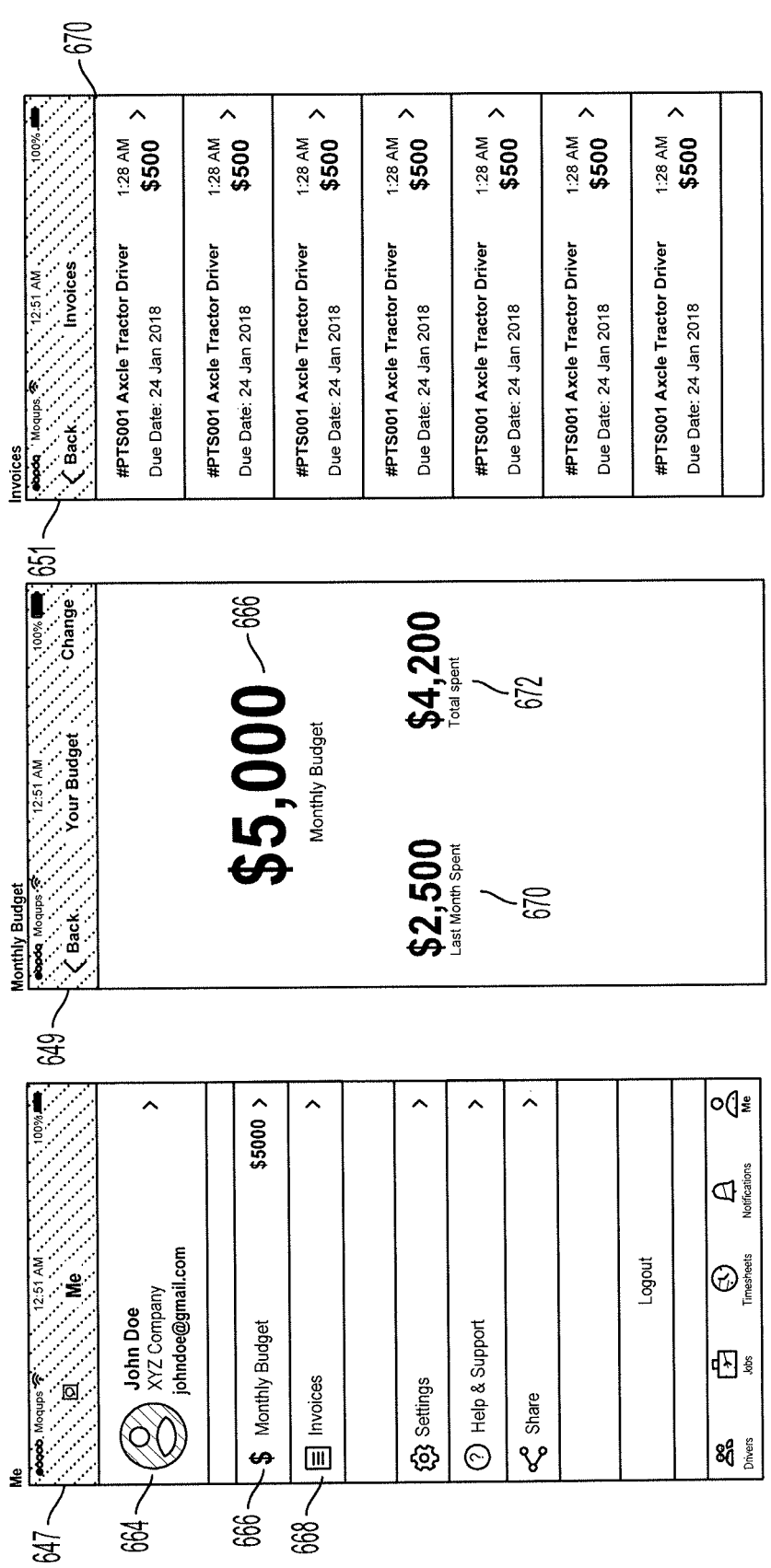

FIGS. 6A-AA shows example wireframe screens within the user interface 130 of the dispatch computing device 102. The below descriptions of FIGS. 6A-6AA are discussed with reference to the system 100 of FIG. 1. The example wireframes are only examples, and the user interface 130 may provide and receive data in any manner and any format and using any interface.

FIG. 6A shows a welcome screen 601 of the staffing application 114. The welcome screen 601 may be the first screen of the staffing application 114 after a user (job dispatcher) has downloaded and launched the staffing application 114. The user is presented with the options of either joining if they have not already signed up with the staffing application 114 or to login if they have already signed up with the staffing application 114.

FIG. 6B shows a login screen 603. The user may enter an e-mail address and password to login to the staffing application 114. In various embodiments, the user may enter any other identifying information such as a username, an identification code, or the like. In various embodiments, the login screen 603 may store the login information so that the user can login without typing his or her information each time he or she uses the application.

FIG. 6C shows a reset password screen 605 that allows the user to reset their password if they forgot it. In various embodiments, the server 108 may verify that the user is an authorized user. For example, the server 108 may compare an email address with a registered email address and email a password reset link to the email address. As another example, the server 108 may receive a social security number, CDL registration number, date of birth, or the like and compare that information with information stored on the server 108.

FIG. 6D shows a phone verification screen 607 for a user to verify their phone number upon signing up with the staffing application 114. The server 108 may store the phone number in a database associated with the user.

FIG. 6E shows an end user license agreement screen 609 that the user must agree to before being able to access the staffing application 114. The end user license agreement may include any terms that are legal or applicable in the jurisdiction of the user and/or the system 100.

FIG. 6F shows a signup code screen 611 for a user to input the code received as a result of the phone verification screen 607 in FIG. 6D. For example, the server 108 may text a code to the provided number, or may call the provided number and provide a code, to ensure that the phone number provided in FIG. 6D is the correct phone number for the user.

FIG. 6G shows a user sign up screen 613 for a user to input their full name, company name, e-mail address, and password. This information may be used by the server 108 to confirm the user who is signing up or signing into the system using the dispatch computing device 102.

FIG. 6H shows a list view of hired drivers 615 that includes the names of the drivers, the title of the job order each driver is assigned to, the number of hours worked for each job order, and the amount of expenses incurred for each job order. As shown, there is an option to look at a list of past drivers hired. The list of past drivers hired may include similar information as the list of future drivers hired. In some embodiments, a user of the dispatch computing device 102 may enter notes about each past hired driver so that they can remember facts about historical drivers. For example, the note may include whether each driver is timely, whether they are efficient, whether they are polite, or the like. In some embodiments, this information may be shared with other user and, in some embodiments, this information may be private for only the specific user to view.

FIG. 6I shows a map view of hired drivers 617. The hired drivers are shown as icons superimposed on a map. The user may click on each icon to view information the names of the drivers, the title of the job order each driver is assigned to, the number of hours worked, and the amount of expenses incurred. The information may also include the progress of each driver along the route, the ETA of each driver at the specific destination, the cargo being hauled by each driver, the destination of each driver, traffic along the route of each driver, whether a route other than a current route of the driver is preferred, or the like. A dispatcher (or the server 108 or the dispatch computing device 102) may communicate with each driver to provide or receive various information. For example, the server 108 may calculate a new preferred route for a specific driver (e.g., based on current or predicted traffic patterns) and may communicate the new route to the driver. In some embodiments, the user interface 132 of the driver computing device 104 may operate as a navigation screen such that the new route provided by the server 108 may be output via the user interface 132. In some embodiments, the server 108 (or the dispatch computing device 102) may inform the user of the dispatch computing device (or may store a record) that the driver is failing to take the new route. In some embodiments, the driver may be provided with an option to provide information indicating why he or she decided to drive along a route other than the new route (or other than a predetermined route). For example, the driver may be aware that another route is quicker for a variety of reasons, such as more miles on highways (as opposed to city roads), construction being preset along a certain route, or the like. This explanation may help the dispatcher understand why the driver took a non-preferred route, allowing the dispatcher to determine whether to re-hire the driver for a future job order.

As also shown, there is an option to look at a map of past drivers hired. The map of past drivers may illustrate the route each driver took, the amount of time it took each past driver to complete the route, expenses incurred by each past driver, traffic experienced by each driver, or the like.

FIG. 6J shows a hired profile screen 619 of a driver assigned to a current job order. The hired profile 619 shows information such as the name of the driver, the title of the job order the driver is assigned to, the number of hours worked for the current job order, and the amount of expenses incurred for the current job order. Also shown, the one or more driver qualifications of the driver is shown to be a Class C license. The driver's hourly rate is also shown along with user comments, the driver's phone number, and the start date of the current job order. The information may further include an estimated time remaining for the job order, an estimated total time for the job order, the type of cargo, the destination, or the like.

FIG. 6K shows a terminate screen 621. Here, the user may either end the contract which terminates the current job order or terminate the driver which fires the current driver but keeps the current job order open for a possible new driver. In some embodiments, the server 108 may determine the current state in which the driver is located, the driver's home state, or any other information that indicates which jurisdiction's employment laws apply to the driver at the current time and location. The server 108 The terminate screed 621 may only show options that are allowed by the testtest FIG. 6L shows a list of job orders screen 623. As shown, job orders may include various items of information. For example, a job order may include a title, an offered hourly rate, a date the job order is to be conducted, a location of the job order, and an indicator of whether the job order is open. In various embodiments, the job order may further include a list of qualifications or endorsements that are required for the job order. In various embodiments, the job order may only be viewed by drivers that have the required qualifications or endorsements. The user may delete individual job orders within the list of job orders screen 623.

FIG. 6M shows a job order details screen 625. As shown, the job order details screen 625 illustrates various additional details about a specific job order. In various embodiments, the job orders screen 623 and the job order details screen 625 may be included in a single screen. For example, the job order details screen 623 may include information such as the job title, the job description, the offered hourly rate, the location of the job order, the date the job order is to be conducted, an indication of whether the job order is classified as the day shift or night shift, whether the job order is assigned to a driver, the one or more driver qualifications or endorsements, or the like.

FIG. 6N shows a list of requests from drivers to be assigned to a job order screen 627. The user may be able to select a driver based on various criteria such as, the driver's distance from the start of the job site, the driver's location, the one or more driver qualifications or endorsements, the driver's reviews (by one or more of the specific dispatcher or reviews by all dispatchers), by an hourly rate of the driver, or the like.

FIG. 6O shows a timesheet screen 629. In various embodiments, the timesheet may be generated by the driver, by the dispatcher, or by the server 108. The user (i.e., dispatcher) may be able to either approve or reject a request to approve hours related to the job order. In various embodiments, the timesheet may be generated by the dispatcher (or by the server) based on monitoring progress of the specific job by the driver. For example, the server 108 (or dispatch computing device 102) may monitor when the driver is actually driving along the route as opposed to lacking forward movement along the route.

As shown, the timesheet screen 629 may illustrate the total hours for all job orders for the current day, the total hours for all job orders for the current week, the total hours for all job orders for the current pay period, the total hours for any other period (which may be predetermined or selected using the dispatch computing device 102), or the total hours for a specific job order. The timesheet screen 629 also details, for each job order, the expenses and expense explanations related to each job order. The timesheet screen 629 may further provide copies of receipts or other evidence for each expense for each job order.

Individual details for each timesheet are shown in FIG. 6P, for example, as a timesheet details screen 631. The timesheet details screen 631 may be viewed by selecting a specific timesheet from the timesheet screen 629 using the dispatch computing device. The timesheet details screen 631 may provide various information such as the job order title, the name of the driver, and any reviews of the driver (including positive and negative feedback; this may allow the dispatcher to monitor the driver for undesirable behavior, and may provide a way for the dispatcher to communicate with the driver that current behavior is unauthorized or undesirable). The timesheet details screen 631 may also or instead show the total hours worked related to the job order, the expenses and expense explanation related to the job order (along with receipts and/or other evidence of the specific expenses), and the location of the job order (including one or more of the start location of the job order, the finish location of the job order, or the current location of the driver along the route). The user (i.e., dispatcher) may have the option of either approving or rejecting some or all of the information on the timesheet details screen 631.

FIG. 6Q shows a timesheet rejection screen 633. The timesheet rejection screen 633 is reached when the user rejects a portion or all the timesheet, and allows the user to input and submit a reason why the timesheet is being rejected. For example, the user may indicate that a portion of the hours worked is being rejected because the driver took an unauthorized route, may reject a portion of expenses because the submitted expenses are greater than those shown in a receipt, or the like.

FIG. 6R shows a driver rating screen 635. The user may rate the driver from one star to five stars based on the driver's performance. The user may also have the option of providing a note that explains the reason for the driver's rating. One or both of the rating or note may be kept private (i.e., only the specific dispatcher, other users authorized by the dispatcher or all dispatchers (i.e., no drivers) may view the rating and/or note) or one or more of the rating or note may be public such that all users of the system can view the rating and/or note.

FIG. 6S shows a notification screen 637. The notification screen 637 may show various updates and information relating to the posted job orders. For example, the notification screen 637 may show the logged hours for a job order, an acceptance of a job order posting, an approval of a job posting, a rejection of a job order posting (e.g., a driver has rejected the job order before or after acceptance), or an indication that a driver has applied to a certain job order posting. The notification screen 637 may show all posted job orders, all accepted job orders, all open job orders, or any combination thereof. The user may select a specific job order to view additional details of the job order.

FIG. 6T shows a job order posting screen 639 where a user may post a job order. The user may select a job order title from a job order title dropdown 640 to provide some indication to a potential driver as to the nature of the job order. In various embodiments, the user may enter any job order name they wish. In some embodiments, the user may select a category from a preselected list of categories, and then enter a name of the job order. The user may select a territorial region from a region dropdown 642, for example the user may select "New Jersey" as the territorial region, may select a starting location of the job order, may select an ending location of the job order, may indicate whether a driver with his or her own truck is needed, or the like.

In various embodiments, the user may enter whether or not the job order is an over the road (OTR) job order. An OTR job order is different than a typical job order as it may require an overnight driving assignment. An OTR job order may require the dispatcher to pay the driver differently for OTR job orders; e.g., the dispatcher may be required to pay based on mileage (instead of or in addition to an hourly rate), may be required to pay per diems for food and/or lodging, may be required to pay for additional expenses (e.g., food), or the like. In various embodiments, a driver may be required to be qualified for OTR jobs. In that regard, an OTR job order may require a driver to be certified or have a specific endorsement for OTR job orders. Thus, a driver without the OTR endorsement may not be able to view or fulfill OTR job orders. For OTR job orders, the system may work differently than for daily jobs. For example, additional types of expenses may be available for reimbursement, the time sheet may be replaced or supplemented with a mileage sheet, or the like. In some embodiments, the system may attempt to match a driver who has accepted an OTR job order to an OTR job order that takes the driver from a location near the destination of the first OTR job order to a location near the starting point of the first OTR job order.

The user may select the one or more driver qualifications and/or endorsements in the class dropdown 644. The qualifications and/or endorsements may be selected by the dispatcher based on the requirements of the specific job. For example, if tie down experience is required, tie down experience may be set as a driver qualification or endorsement. As shown, the user may select between a Class A license, a Class B license, or a Class C license. In various embodiments, the user may also or instead select one or more CDL endorsement in the same class dropdown 644 or a different dropdown, or different format altogether. The endorsements may include, for example, a passenger transport endorsement (P), a school bus/passenger transport combo endorsement (S), a double/triples endorsement (T), a tank vehicle endorsement (N, tanker), a hazardous materials endorsement (HAZMAT, H), a tanker/HAZMAT combo endorsement (X), or the like. The user may select one or more CDL endorsement that is required for the specific job order.

The user may select the hourly rate in the hourly rate bar 646. The hourly rate bar 646 may have a minimum rate, for example $10 an hour, and a maximum rate, for example $500 an hour. In some embodiments, the user may select a range of hourly rates such as a maximum hourly rate and a minimum hourly rate for each job order. The server 108 or the dispatch computing device 102 may receive applications from multiple applicants for each job order, each application including an hourly rate (either corresponding to the driver's preset hourly rate or an hourly rate specifically entered by the driver for the specific job. The server 108, the dispatch computing device 102, or a dispatcher may select a driver for the job based on an algorithm that may be at least partially based on the hourly rate. For example, a driver with a lowest hourly rate may be selected in order to save money for the dispatch company. As another example, the algorithm may select a driver that has the lowest hourly rate and also meets other criteria (e.g., meets a minimum driver rating (e.g., at least 4 out of 5 stars)). The other criteria may be selected by the dispatcher. In various embodiments, the processor 110 of the dispatch computing device 102, or the processor 126 of the server 108, may learn desired criteria of the dispatchers and may select desirable criteria for dispatchers after learning the preferences.

The user may post the start date 648 of the job order and the availability 650 for when the job order may be fulfilled. In some embodiments, the start date 648 and time to complete the job may be flexible, and in some embodiments, it may be more rigid. This information may be utilized by drivers to determine whether they can complete the job in the required amount of time. In some embodiments, the user may further post the estimated time requirement of the job. For example, if the job is expected to take 10 hours, the user may enter the estimated time. In some embodiments, the time estimate may be calculated by the server 108 and/or the dispatch computing device 102 based on a departure time and a navigation tool, and may or may not take into account traffic along the route.

In some embodiments, the user may input a description in the description box 652 to provide a more detailed description of what the job order entails. For example, the description may include whether the job only requires driving or whether it requires loading/unloading cargo, whether it includes multiple stops along a route, whether it requires returning a commercial vehicle to the starting location, or the like.

FIG. 6U shows a list view of hired drivers by past 641 that includes the names of the drivers, the title of the job order each driver was assigned to, the number of hours worked, and the amount of expenses incurred. This information may be used by the dispatcher to determine the effectiveness of each driver. In some embodiments, notes generated by the dispatcher may be placed into this view, or accessed from this view, to help a dispatcher decide whether to re-hire a driver for a new job order.

FIG. 6V shows a past driver filter screen 643. The user may use the budget bar 654 to filter the past hired drivers by their budget. The budget may be the total amount for the job order, may be the hourly rate for the job order, may be the hourly rate of the driver in specific, may include any expenses submitted by the driver, or the like.

FIG. 6W shows a driver details screen 645 that includes the name of the driver, the title of the job order the driver is requesting to be assigned to, and the driver's location. The driver details screen 645 may include one or more verifications 656 detailing that the one or more driver qualifications have been verified. For example, the commercial driver's license (CDL), the living address, and the social security number of the driver are all shown to be verified. There may be a driver summary 660 having a short bio of the driver that details their experience and/or work ethics. In some embodiments, only qualifications and/or endorsements that have been verified by the system 100 may be shown in the driver summary 660 and, in some embodiments, all qualifications and endorsements that the driver alleges he holds may be shown in the summary 660, with a note indicating which qualifications and endorsements have been validated or verified by the system 100. The user may press a hire button 658 to hire the driver. In some embodiments, the user may press the hire button 658 to hire the driver for a specific job order. In some embodiments, the user may wish to hire the driver for a future job order and may make a selection indicating that the driver is a desirable driver for future job orders. The selection that indicates that the driver is desirable for future jobs may be available at any screen in which information about the driver is shown.

After the user has pressed the hire button 658 in FIG. 6W, an accept proposal button 662 in FIG. 6X may come up to ensure that the user indeed wants to hire the driver. In that regard, the driver may not be hired for the specific job order until the accept proposal button 662 has been selected by the user. This ensures that the user does not accidentally select an undesirable driver for a specific job order.

FIG. 6Y shows a user information screen 647. The user's name, company name, and e-mail address may be detailed in user details 664, along with other information. For example, the information may include an average number of jobs per day/week/month/etc., an average hourly rate for past jobs, an average distance for past jobs, how many OTR jobs have occurred, average expenses paid per job (and per job type), or the like. The monthly budget 666 indicates the monthly budget for job orders. The monthly budget may be set by the user's company or by the user, or may be calculated based on a yearly budget divided by 12 months. Invoices 668 contains invoices for all job orders created by the user. For example, the user may click the invoices 668 selection to review all invoices for a predetermined historical period of time. In that regard, if the user wishes to view all invoices for the previous 12 months, the user may do so via the invoices 668 selection.

A monthly budget screen 649 in FIG. 6Z details the status of the monthly budget 666. The monthly budget screen 649 may indicate the total money spent in the previous month, as last month spent 670, and the total amount spent so far for the current month, as total spent 672. In various embodiments, the monthly budget screen 649 may further illustrate a percentage of budget remaining for the month or for a year, a percentage of budget that was spent for a previous month, a remaining budget for the current month or the current year, or the like.

An invoice screen 651 in FIG. 6AA has the detailed invoice list 670 showing all job orders created by the user. In various embodiments, the user may personalize the invoice screen 651 to show all unfilled jobs, all completed jobs, all jobs in progress, or any combination thereof. The user may also use this screen to show all jobs that went over budget, all jobs that were completed under budget, all jobs that met the budget within a specific range (e.g., all completed jobs that were completed for within 5 percent (5%) of the budget set for the job), or the like.

Figures 7A, 7B, 7C:
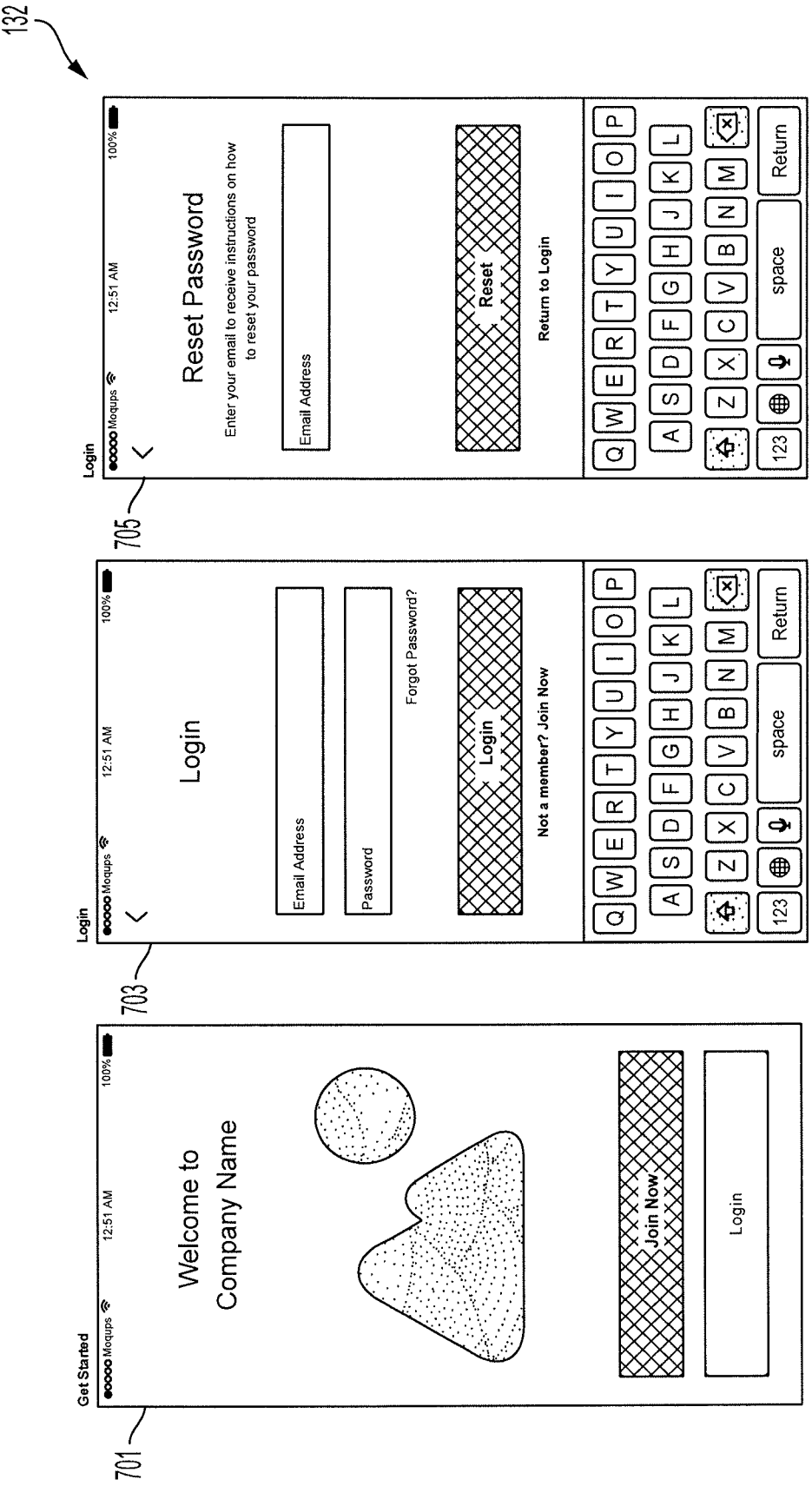
FIGS. 7A-7EE shows example wireframe screens within the user interface of the driver computing device of FIG. 1 according to an aspect of the invention.

FIGS. 7A-EE shows example wireframe screens within the user interface 132 of the driver computing device 104. These example wireframe screens may be shown in the user interface 132 of the driver computing device 104, and description of these wireframes may be made with reference to FIG. 1.

FIG. 7A shows a welcome screen 701 of the staffing application 122. The welcome screen 701 may be the first screen of the staffing application 122 after a user (driver) has downloaded and launched the staffing application 122. The user is presented with the option of joining if they have not already signed up with the staffing application 122 or to login if they have already signed up with the staffing application 122.

FIG. 7B shows a login screen 703. The user (e.g., a driver) may enter an e-mail address (or other identifier, such as a username) and a password to login to the staffing application 122. In various embodiments, the user may log in using a biometric such as a face scan, a fingerprint scan, an iris scan, or the like. For example, the user interface 130 may include a biometric scanner that allows for such a biometric scan. In various embodiments, the login screen 703 may store the login information so that the user can login without typing his or her information each time he or she uses the application.

FIG. 7C illustrates a reset password screen 705 that allows the user to reset their password if they forgot it. The system 100 may allow the user to reset their password using any known technique such as sending a verification code to a phone number on file, an email address on file, allowing a user to answer security questions, allowing a user to enter an authorization number (such as a social security number), or the like.

Figures 7G, 7H:
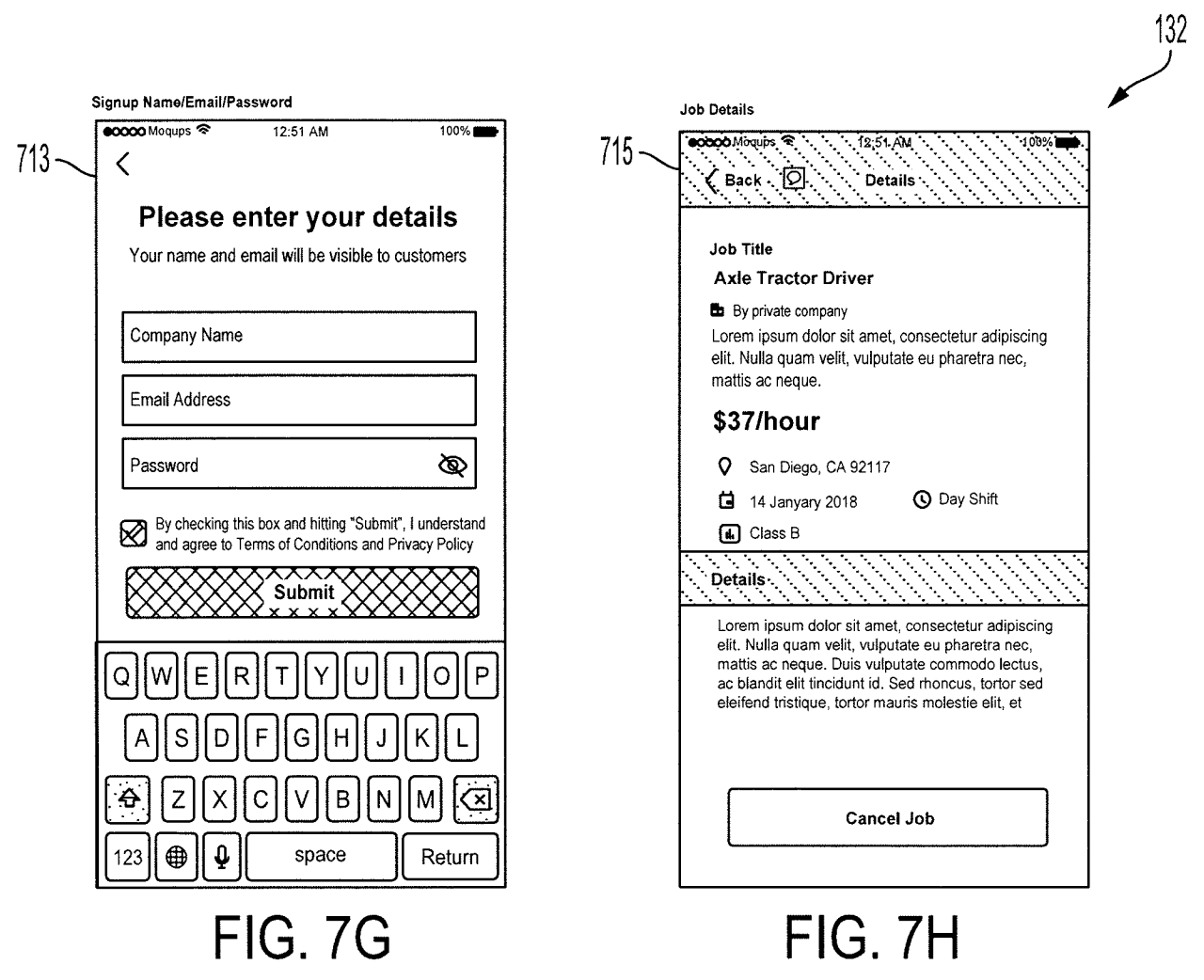
Figure 7K:
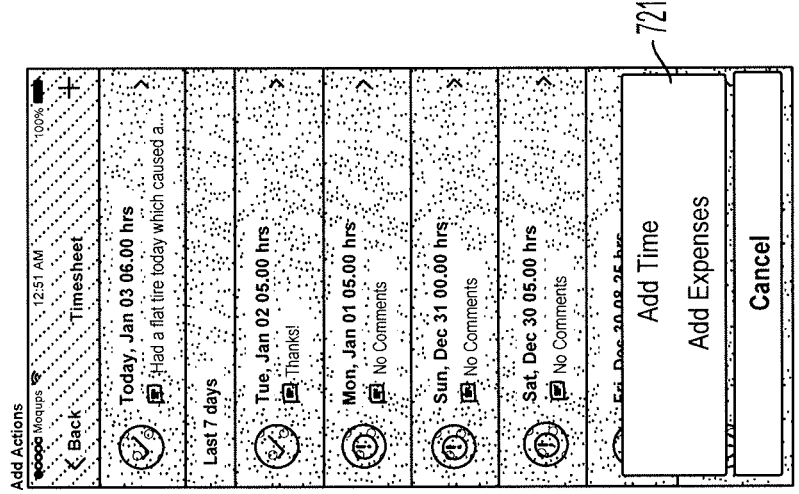
Figure 7S:
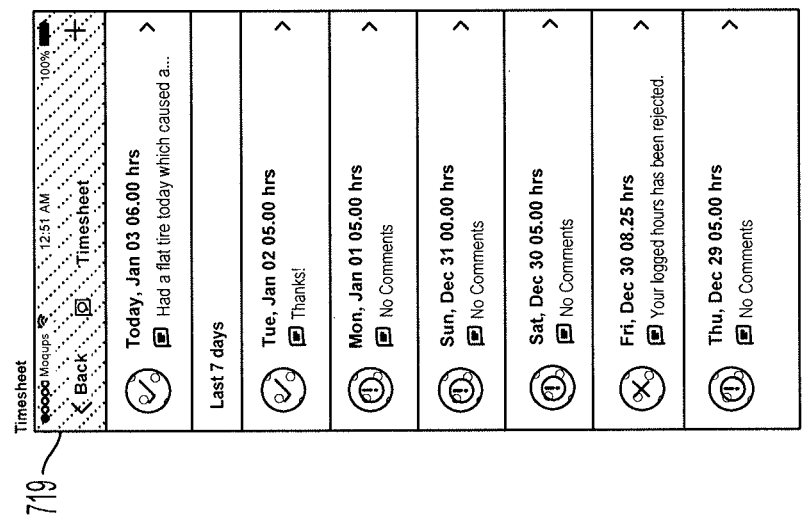
Figure 7I:
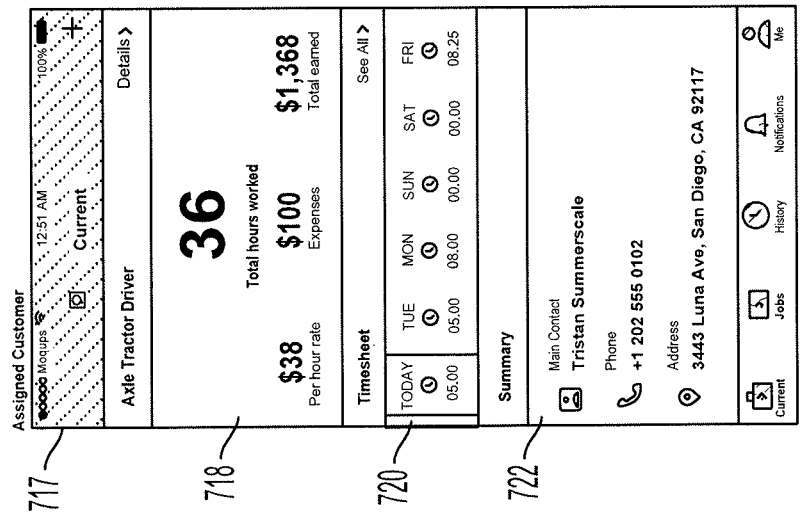
Figures 7L, 7M, 7N:
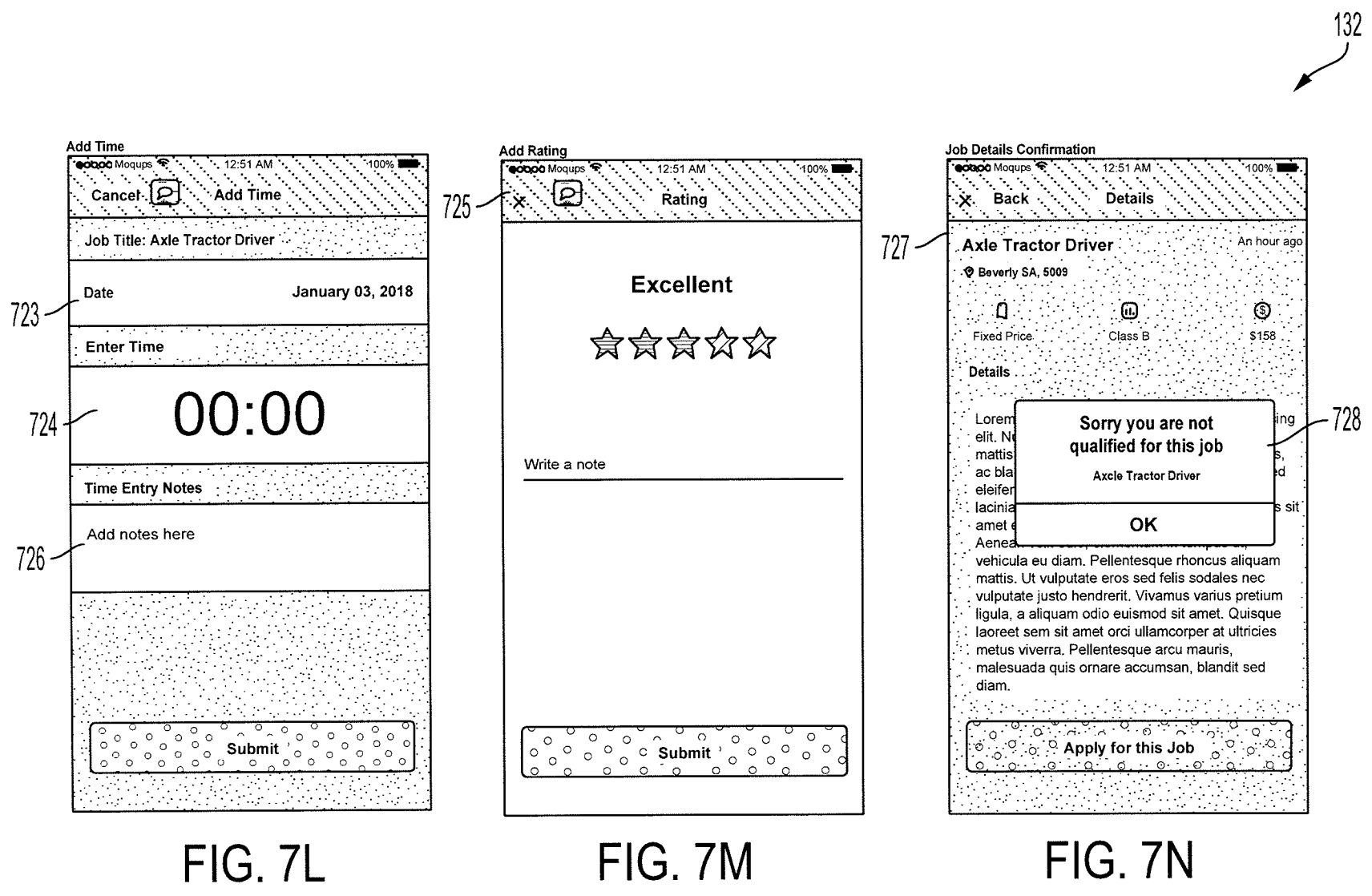
Figure 7T:
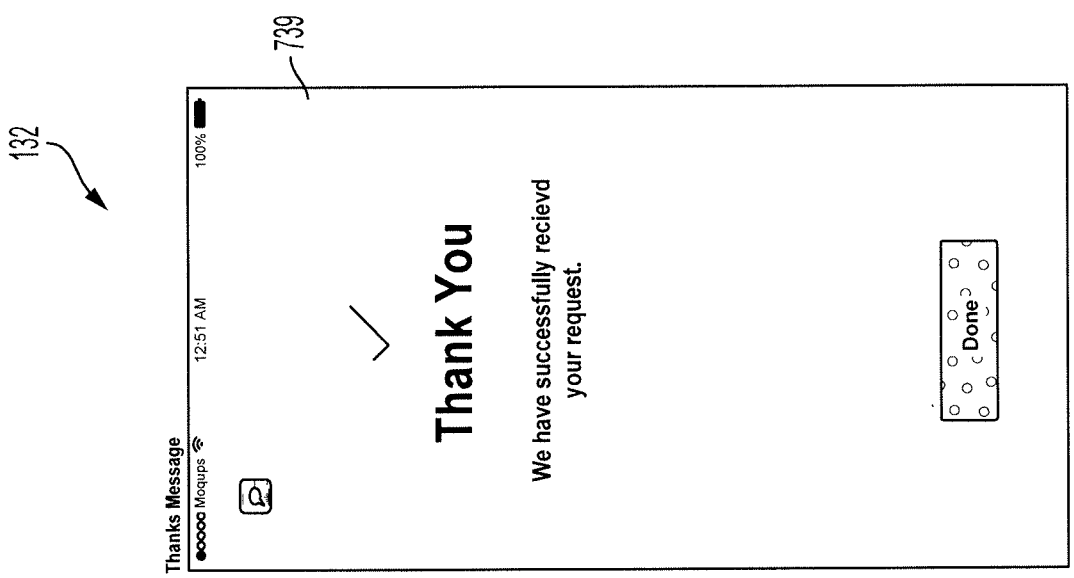
Figure 7S:
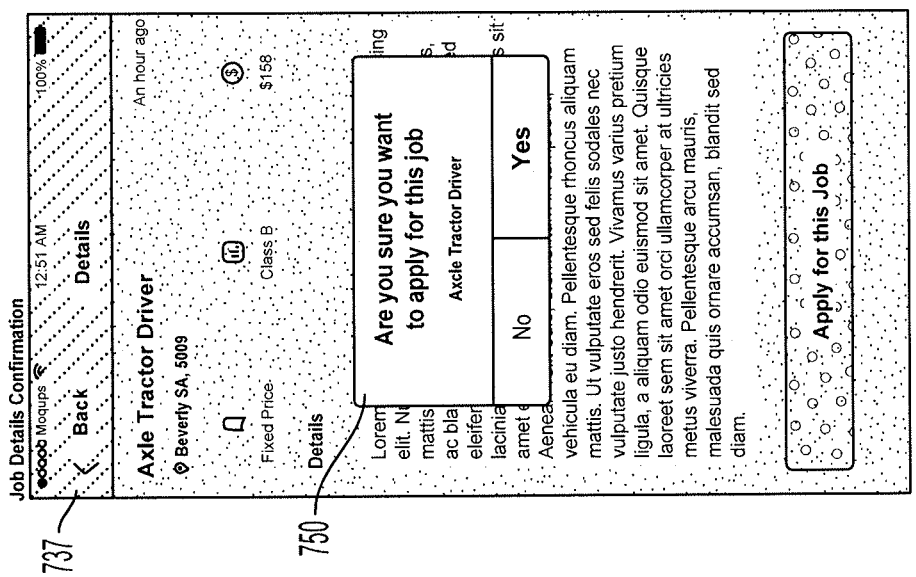
Figure 7R:
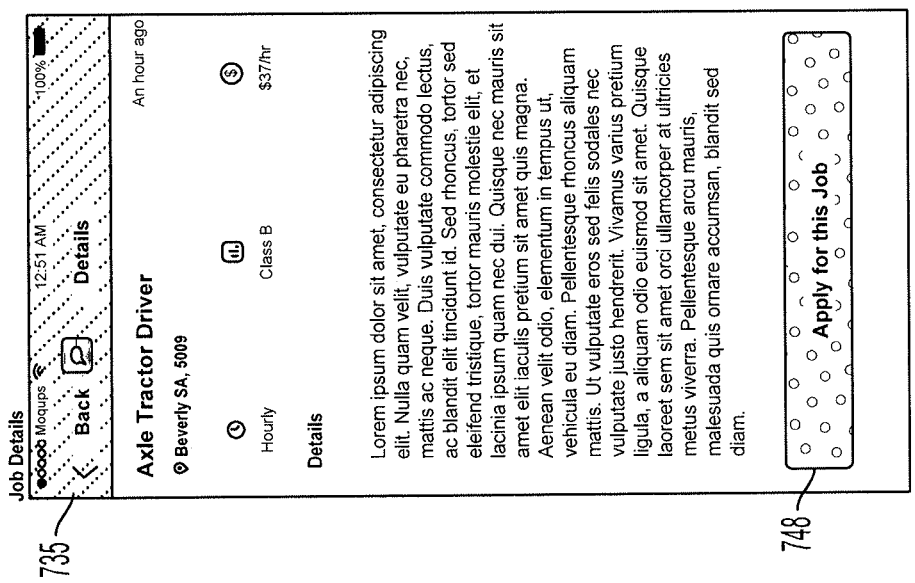
Figure 7X:
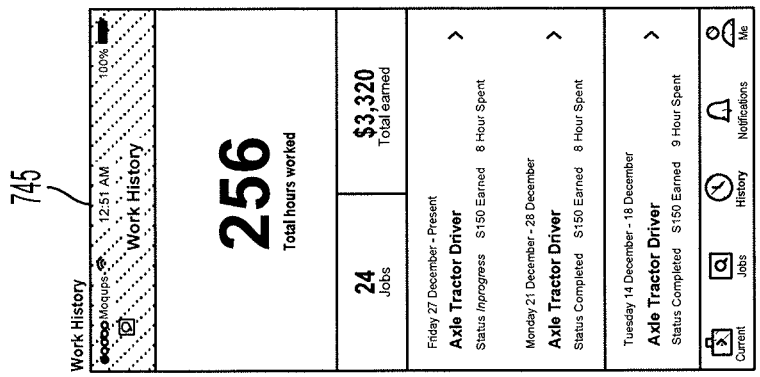
Figure 7W:
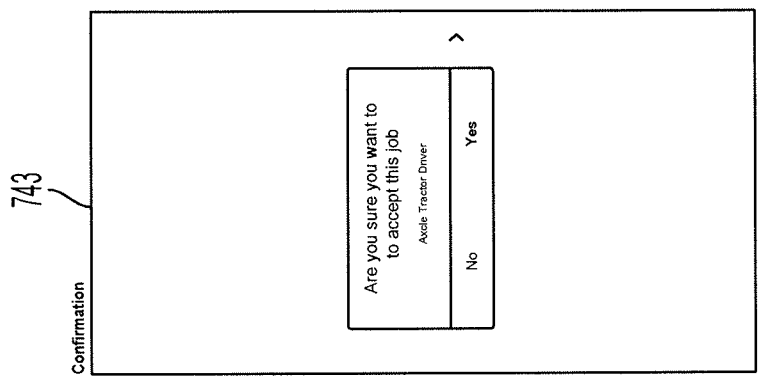
Figure 7V:
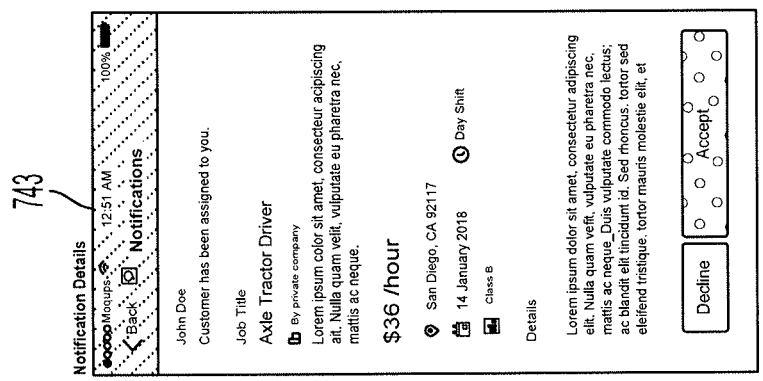
Figure 7U:
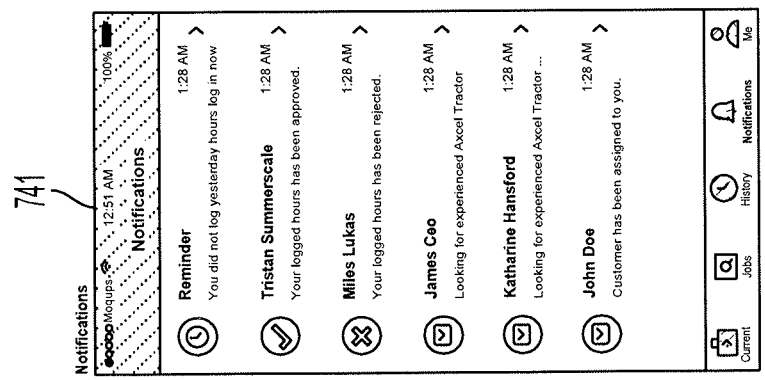
Figure 7C:
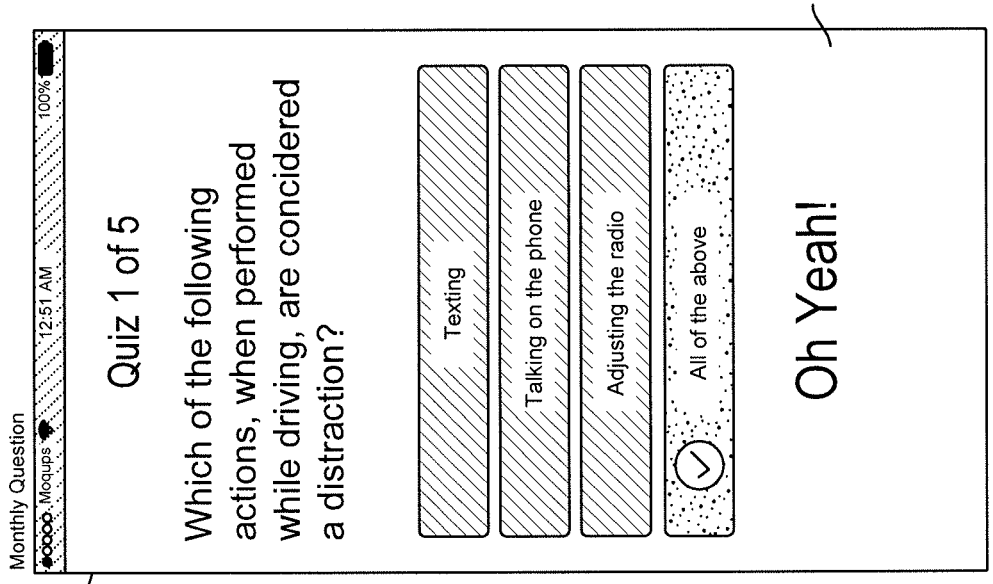
Figure 7B:
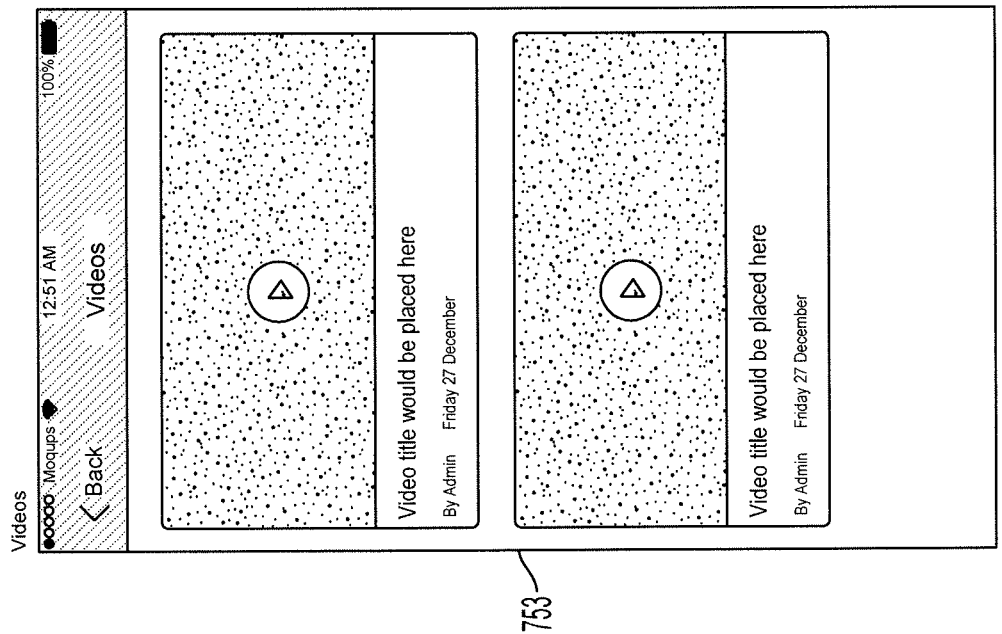
Figure 7E:
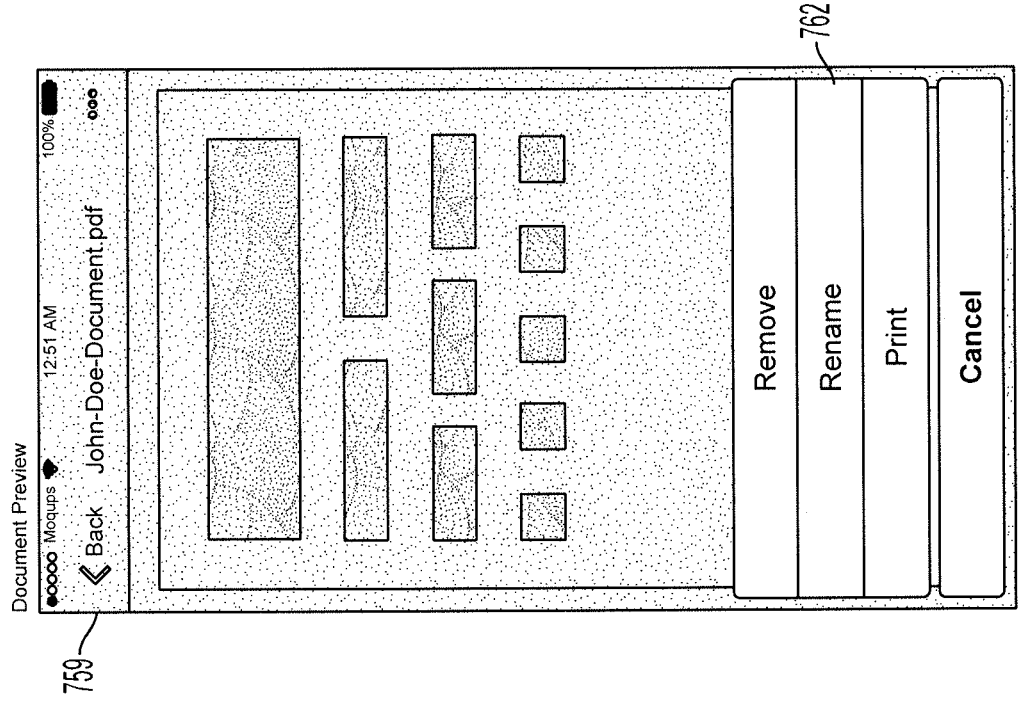
Figure 7D:
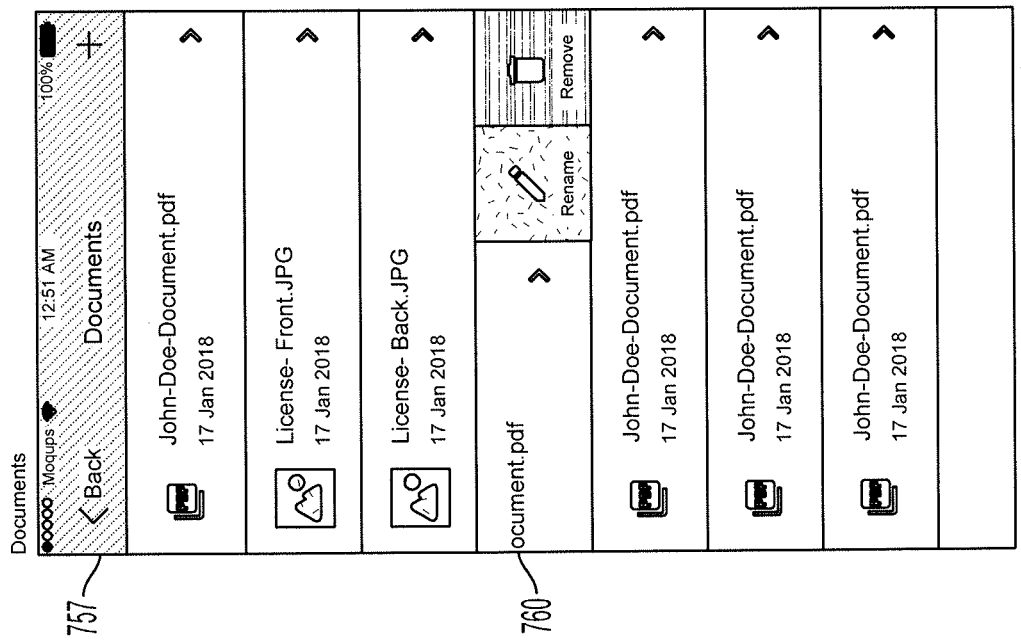

FIG. 7D shows a phone verification screen 707 for a user to verify their phone number upon signing up with the staffing application 122. The server 108 may store the phone number in a database associated with the user.

FIG. 7E shows an end user license agreement screen 709 that the user must agree to before being able to access the staffing application 122. The end user license agreement may include any terms that are legal or applicable in the jurisdiction of the user and/or the system 100.

FIG. 7F shows a signup code screen 711 for a user to input the code received at a result of the phone verification screen 707 in FIG. 7D.

FIG. 7G shows a user sign up screen 713 for a user to input various personal information. For example, the user (e.g., driver) may provide their full name, e-mail address, password, qualifications, endorsements, age, desired hourly rates, physical address, maximum distance they are willing to travel, their driving history, their driving record (as provided by a DMV), which jurisdictions they are authorized to drive, or the like. The user may provide additional information such as which days of the week they are willing to work, whether they are willing to drive OTR jobs, whether they require expenses to be covered, whether they have a maximum distance they are willing to drive, any scheduled vacation days or time off (for personal or medical reasons), a notification of whether they are currently disabled (and, if so, how long the disability is likely to last), how far they are willing to travel from their current location to the start of a job site (e.g., they may indicate that they are willing to travel 50 miles from their residence to a starting location of a driving route), or the like.

FIG. 7H shows a job order details screen 715. As shown, the job order details screen 715 may illustrate jobs available to a driver. The job order screen 715 may provide information regarding available jobs such as a job order title, a job order description, an offered hourly rate, a maximum hourly rate, a location of the job order, a distance of the job (e.g., whether it is a 200 mile drive or a 50 mile drive), whether expenses are covered, whether the job is an OTR job, a date the job order is to be conducted (or a range of dates if the date is flexible), an indication of whether the job order is classified as a day shift or night shift, or the like.

FIG. 7I shows a current job order screen 717 that illustrates data corresponding to a current job the driver is working, a past job the driver worked, or a future job the driver is scheduled to work. The numerical summary 718 details the total number of hours worked, the hourly rate, the amount in expenses, and the total amount earned by the driver. The numerical summary 718 may be for current jobs that the driver is working or for past jobs that the driver has worked. The numerical summary 718 may differ based on whether the job is a OTR job or a non-OTR job. The timesheet 720 details the hours worked on the job order for each day of the week. In various embodiments, the timesheet 720 may be generated by the driver (e.g., by the driver computing device 104) and transmitted to the dispatcher (e.g., the dispatch computing device 102) and, in various embodiments, the timesheet 720 may be generated by the dispatch computing device 102 and transmitted to the driver computing device 104. For example, a sensor in the driver computing device 104 may track the driver's progress along the job order and transmit the progress to the server 108 or the dispatch computing device 102, and the server 108 or dispatch computing device 102 may calculate the timesheet based on the driver's progress. The summary 722 may provide information such as a contact name, contact phone number, and address of the job dispatcher related to the job order. The summary 722 may apply to any past, present, or future job orders of the driver.

FIG. 7J shows a detailed timesheet 719 that indicates the number of hours worked on the job order for each day of the week as well as comments from the job dispatcher. As mentioned above, the detailed timesheet 719 may be generated by the driver, the dispatcher, the dispatch computing device 102, or the driving computing device 104. In various embodiments, the detailed timesheet 719 may be generated by the server 108.

In FIG. 7K, the driver is able to either add time or expenses to the job order using the add time/expenses button 721. After the driver has selected the add time/expenses button 721 in FIG. 7K, the driver may be able to enter time 724 in FIG. 7L. The driver may also be able to enter time entry notes 726 to explain/justify the hours spent on the job order. In various embodiments, the timesheet 719 may be generated automatically by the server 108, the dispatch computing device 102, or the driver computing device 104 based on data detected by one or more sensor of the server 108, the dispatch computing device 102, or the driver computing device 104. The driver computing device 104 may travel with the driver along a route. In that regard, a sensor (such as a GPS sensor) may detect the location of the driver computing device 104 along the route. The data detected by the sensor (such as GPS coordinates) may determine specifically where the driver is along the route. In that regard, the driver may keep the driver computing device 102 on his person at all times, thus allowing the server 108 to monitor the location of the driver along the entirety of the route (and track the progress of the driver along the route). For example, if the driver takes a detour that is longer than a preauthorized detour, then the time (or the distance) of the detour may be removed from the time (or distance) of the authorized route of the driver) backspace.

FIG. 7M shows a job order rating screen 725. The driver may be able to rate the job order from one star to five stars (or using any other rating system, such as from 1 to 10 stars, 124 stars, or the like) based on the driver's professional opinion of the job order, the quality of the commercial vehicle, the accuracy of the estimate of the routes time, the delay between submitting the timesheet and receiving payment, or any other metric which may relate information corresponding to the quality of the dispatcher. The driver may also have the option of providing a note that explains the reason for the job order's rating (e.g., whether certain expenses were rejected for specific reasons, whether the predicted routes time was unreasonable, or the like).

FIG. 7N shows a denial screen 727 that details a denial of the request to be assigned a job order. If the driver does not have the necessary one or more driver qualifications or endorsements, the driver may receive a denial popup 728 that notifies the driver that they are not qualified for the job order and that their request to be assigned the job order is denied. In various embodiments and as described above, the driver may submit a minimum hourly rate. In some embodiments,n the denial screen 727 may pop up if the drivers minimum hourly rate is greater than the minimum hourly rate set by the dispatcher using the dispatch computing device 102. For example, if the dispatch computing device 102 selects a minimum hourly rate of $25 per hour and the driver's minimum hourly rate is $25 per hour then the driver may receive the denial screen 727.

FIG. 7O shows a find job orders screen 729. Here, the driver may search for available job orders or may scroll through listings of available job orders. The available job orders may detail whether the job order pays by the hour 730 or by a set amount, whether the job it is an OTR job, whether expenses are available for the specific job, or the like. The available job orders may detail the one or more driver qualifications 732, for example a Class B license or a hazmat endorsement. The paid hourly rate 734 may also be detailed in the available job orders.

FIG. 7P shows a map find jobs screen 731 where a driver may find job orders based on the location of the job orders and other information. For example, the find jobs screen 731 may find a job based on hourly rates for the jobs, based on whether the jobs are OTR jobs, based on whether the jobs pay for expenses along the route, whether certain endorsements are required for specific jobs, whether a driver is required to provide his own commercial vehicle, or the like.

FIG. 7Q shows a find job order filter screen 733. The driver may filter the available job orders by zip code 736, by the one or more driver qualifications 738, by the hourly rate 740, by the job order title 742, by the need of a verified driver or an unverified driver 744, or by a dropdown of skills and endorsements 746.

FIG. 7R shows a job order details screen 715. As shown, the job order details screen 715 details the job order title, the job order description, the offered hourly rate, the location of the job order, the date the job order is to be conducted, an indication of whether the job is classified as a day shift or night shift, and one or more driver qualifications or endorsements. An application button 748 allows the driver to request assignment to the job order. FIG. 7S shows a job order confirmation page 737 with a second application button 750 to ensure that the driver indeed wants to request assignment to the job order. FIG. 7T shows a confirmation screen 739 that indicates that the request for assignment to the job order has been received.

FIG. 7U shows a notification screen 741. The notification screen 741 may show various updates and information relating to posted job orders. For example, the notification screen 741 may show a reminder to log hours worked for a job order, a notification that logged hours have been approved by a job dispatcher, or a notification that logged hours have been rejected by a job dispatcher.

FIG. 7V shows a job order acceptance screen 743 where a driver may accept an offer from a job dispatcher to be assigned to a job order. The driver may accept or decline using the accept/decline button 752. FIG. 7W shows the job order acceptance screen 743 with a confirmation button 754 to ensure that the driver indeed wants to accept assignment to the job order. FIG. 7X shows a work history screen 745 that may detail the total number of hours works on job orders, the number of job orders, the total amount earned, and a detailed list of each job order performed by the driver.

FIG. 7Y shows a driver information screen 747 where the driver may access their documents, settings, upload videos, access help and support, share, or logout. FIG. 7Z shows the profile screen 749 detailing the driver's information 756. The driver's information may include their e-mail address, their phone number, their commercial driver's license (CDL) ID, their commercial license class, and their living address. FIG. 7AA shows the edit profile screen 751 where the driver may edit the driver's information 756.

FIG. 7BB shows a videos screen 753 where the driver may upload videos to their profile. The uploaded videos may include bio videos, introductory videos, or other videos that the driver may upload for job dispatchers to view.

FIG. 7CC shows a quiz screen 755 where the driver may receive one or more questions evaluating their driving skills. The questions are shown to be in multiple choice format but may also be in essay format. After the driver has entered their answer, the driver may receive an answer prompt 758 showing if they chose the correct answer or not.

FIG. 7DD shows a documents screen 757 where the driver's uploaded documents are listed out. The uploaded documents may include pictures of their one or more driver qualifications such as their commercial driver's license (CDL) or any other document used to certify that they are qualified to operate a commercial vehicle. The driver may select each upload document to rename or delete using the rename/delete feature 760. FIG. 7EE shows a document information screen 759 where the driver may review the uploaded document. The driver may also print the document using the document action feature 762.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A method for staffing a commercial vehicle with a driver, comprising:
   sending to a server, by a dispatch computing device associated with a job dispatcher, a job order to staff a commercial vehicle with a driver, the job order having one or more required driver qualifications and dispatch-established hourly rate information, the job dispatcher being associated with a transport company;
   receiving, from a driver computing device associated with the driver, an identification of the driver, driver-established hourly rate information, and one or more driver qualifications;
   verifying, by the server, the one or more driver qualifications in response to receiving the identification of the driver and the one or more driver qualifications, the verification including verifying the one or more driver qualifications with an issuing agency via electronic communication between the server and a computing device associated with the issuing agency;
   sending, to the driver computing device, one or more questions that are designed to test knowledge of the driver;
   receiving, from the driver computing device, answers to the one or more questions;
   determining an accuracy percentage corresponding to correct answers to the one or more questions;
   denying, by the server, access to the driver to request assignment to the job order when an accuracy percentage of the answers is less than a predetermined accuracy percentage;
   comparing the driver-established hourly rate information to the dispatch-established hourly rate information;
   granting, by the server, access to the driver to request assignment to the job order when the one or more driver qualifications are verified and when the driver-established hourly rate information matches the dispatch-established hourly rate information, wherein the dispatch-established hourly rate information includes an employer maximum hourly rate, and the driver-established hourly rate information matches an employer-established hourly rate information when a specific driver hourly rate of an employee-established hourly rate information is less than or equal to the employer maximum hourly rate;
   outputting, by the driver computing device, a maps job screen that outputs jobs information including locations of a plurality of job orders including the job order along with additional information corresponding to the plurality of job orders;
   receiving, from the driver computing device, a request to be assigned to the job order;
   receiving, from a plurality of driver computing devices associated with a plurality of drivers, a plurality of applications for the job order, the plurality of applications including driver-established hourly rate information for each of the plurality of drivers;
   selecting, by at least one of the server or the dispatch computing device, a selected driver from the plurality of applications based on a combination of the driver-established hourly rate information for each of the plurality of drivers and additional information associated with each driver;
   assigning, by the dispatch computing device, the job order to the driver by accepting the request received from the driver computing device; and
   generating, by the dispatch computing device, a map showing a location of the driver in real-time and tracking a progress of the driver along a route associated with the job order.

2. The method of claim 1, wherein the map generated by the dispatch computing device further includes objects representing a plurality of drivers including the driver and additional drivers, and wherein each object representing one of the plurality of drivers is selectable to output additional information corresponding to a selected driver associated with the selected object including a driver name of the selected driver, a title of a present job order of the selected driver, and a quantity of hours worked by the selected driver.

3. The method of claim 1, further comprising:
   outputting, by the driver computing device, a list of job orders including the job order that the driver is qualified to perform, the list of job orders including jobs that the driver is qualified to perform and excluding jobs that the driver is unqualified to perform based on the one or more driver qualifications and required driver qualifications of the plurality of job orders including the one or more required driver qualifications associated with the job order.

4. The method of claim 1, wherein the one or more driver qualifications comprises evidence of at least one of vehicle insurance, driver insurance, or a commercial driver's license (CDL).

5. The method of claim 1, further comprising:
receiving, from the dispatch computing device, an indication that the driver is desirable for future jobs; and
outputting, by the dispatch computing device, driver information associated with the driver and including the one or more driver qualifications and information indicating that the dispatch computing device previously indicated that the driver is desirable for the future jobs.

6. The method of claim 1, further comprising denying the driver access to request assignment to the job order when at least one of the one or more driver qualifications are not verified.

7. The method of claim 1, further comprising:
receiving, from the driver computing device, a request to approve expenses related to the job order;
automatically denying, by the dispatch computing device, the expenses when the expenses are greater than a predetermined budget; and
approving, by the dispatch computing device, the expenses related to the job order.

8. The method of claim 1, further comprising:
determining, by the server, at least one driver certificate or endorsement based on the one or more driver qualifications;
determining, by the server, a required driver certificate or endorsement based on the one or more driver qualifications included in the job order; and
denying, by the server, ability of the driver to request assignment to the job order when the at least one driver certificate or endorsement of the driver fails to include the required driver certificate or endorsement.

9. The method of claim 1, further comprising:
receiving, from the driver computing device, a request to approve hours related to the job order;
automatically denying, by the dispatch computing device, the hours when the hours are greater than a predetermined time limit; and
approving, by the dispatch computing device, the hours related to the job order.

10. The method of claim 1, wherein receiving the one or more driver qualifications includes receiving, from at least one of the driver computing device or the dispatch computing device, the one or more driver qualifications based on qualification data that is received from the driver via at least one of an email or a fax.

11. A method for staffing a temporary job with an employee, the temporary job requiring at least one qualification, the method comprising:
sending to a server, by an employer computing device associated with an employer, a job order to staff the temporary job with the employee and employer-established hourly rate information, the job order having one or more qualifications;
receiving, from an employee computing device associated with the employee, an identification of the employee, employee-established hourly rate information, and one or more employee qualifications;
verifying, by the server, the one or more employee qualifications in response to receiving the identification of the employee and the one or more employee qualifications, the verification including:
transmitting, by the server, an identifier of the one or more employee qualifications to a computing device associated with an issuing agency via electronic communication between the server and the computing device associated with the issuing agency, and
receiving, by the server, a validation of the one or more employee qualifications from the computing device associated with the issuing agency;
sending, to the employee computing device, one or more questions that are designed to test knowledge of the employee;
receiving, from the employee computing device, answers to the one or more questions;
denying, by the server, access to the employee to request assignment to the job order when an accuracy percentage of the answers is less than a predetermined accuracy percentage;
comparing the employee-established hourly rate information to the employer-established hourly rate information;
granting, by the server, access to the employee to request assignment to the job order when the one or more employee qualifications are verified and when the employee-established hourly rate information matches the employer-established hourly rate information wherein the employer-established hourly rate information includes an employer maximum hourly rate, and the employee-established hourly rate information matches the employer-established hourly rate information when a specific employee hourly rate of the employee-established hourly rate information is less than or equal to an employer maximum hourly rate;
outputting, by the employee computing device, a maps job screen that outputs jobs information including locations of a plurality of job orders including the job order along with additional information corresponding to the plurality of job orders;
receiving, from the employee computing device, a request to be assigned to the job order;
receiving, from a plurality of employee computing devices associated with a plurality of employees, a plurality of applications for the job order, the plurality of applications including employee-established hourly rate information for each of the plurality of employee;
selecting, by at least one of the server or the employer computing device, a selected employee from the plurality of applications based on a combination of the employee-established hourly rate information for each of the plurality of employees and additional information associated with each employee;
assigning, by the employer computing device, the job order to the employee by accepting the request received from the employee computing device; and
generating, by the employer computing device, an interface tracking a progress of the employee carrying out the job order in real-time.

12. The method of claim 11, wherein the job order is at least one of:
assigned to the employee by the employer; or
assigned automatically to the employee based on an algorithm.

13. The method of claim 11, wherein the identification of the employee comprises at least one of a name, an e-mail address, a phone number, a social security number, a living address, or a business address.

14. The method of claim 11, wherein verifying the one or more employee qualifications comprises verifying that the one or more employee qualifications are unexpired.

15. The method of claim 11, further comprising:
receiving, from the employee computing device, a request to approve expenses related to the job order; and
approving, by the employer computing device, the expenses related to the job order.

16. A system for staffing a commercial vehicle with a driver, the system comprising:
a dispatch computing device configured to:
transmit a job order to staff a commercial vehicle with a driver, the job order having one or more driver qualifications including a required driver certificate or endorsement and dispatch-established hourly rate information, the job dispatcher being associated with a transport company,
receive, from a plurality of driver computing devices associated with a plurality of drivers, a plurality of applications for the job order, the plurality of applications including driver-established hourly rate information for each of the plurality of drivers,
select by at least one of a server or the dispatch computing device, a selected driver from the plurality of applications based on a combination of the driver-established hourly rate information for each of the plurality of drivers and additional information associated with each driver,
assign the job order to the driver when the driver is authorized, and
generate a map showing a location of the driver in real-time and tracking a progress of the driver along a route associated with the job order;
a driver computing device configured to:
transmit an identification of the driver, driver-established hourly rate information, and one or more driver qualifications including at least one driver certificate or endorsement,
output a maps job screen configured to display job information including locations of a plurality of job orders including the job order along with additional information corresponding to the plurality of job orders, and
transmit a request to be assigned to the job order; and
a server in communication with the dispatch computing device and the driver computing device and configured to:
verify the one or more driver qualifications in response to receiving the identification of the driver and the one or more driver qualifications by verifying the one or more driver qualifications with an issuing agency via electronic communication between the server and a computing device associated with the issuing agency,
send one or more questions to the driver computing device that are designed to test knowledge of the driver,
receive answers to the one or more questions from the driver computing device,
determine an accuracy percentage corresponding to correct answers to the one or more questions,
deny ability of the driver to request assignment to the job order in response to at least one of the at least one driver certificate or endorsement failing to include the required driver certificate or endorsement, or the accuracy percentage of the answers being less than a predetermined accuracy percentage,
compare the driver-established hourly rate information to the dispatch-established hourly rate information; and
grant access to the driver to request assignment to the job order when the one or more driver qualifications are verified and when the driver-established hourly rate information matches the dispatch-established hourly rate information, wherein the dispatch-established hourly rate information includes an employer maximum hourly rate, and the driver-established hourly rate information matches an employer-established hourly rate information when a specific driver hourly rate of an employee-established hourly rate information is less than or equal to the employer maximum hourly rate.

17. The system of claim 16, wherein the server is further configured to verify the one or more driver qualifications by verifying that the one or more driver qualifications are unexpired.

18. The system of claim 16, wherein the one or more driver qualifications further includes commercial drivers license (CDL) endorsements.

* * * * *